United States Patent [19]
Shimizu et al.

[11] Patent Number: 5,794,077
[45] Date of Patent: Aug. 11, 1998

[54] INSTANT CAMERA

[75] Inventors: Mitsuru Shimizu; Ko Aosaki; Michio Cho, all of Saitama, Japan

[73] Assignee: Fuji Photo Film Co., Ltd., Kanagawa, Japan

[21] Appl. No.: 740,392

[22] Filed: Oct. 29, 1996

Related U.S. Application Data

[62] Division of Ser. No. 355,247, Dec. 2, 1994, Pat. No. 5,608,477.

[30] Foreign Application Priority Data

| Dec. 3, 1993 | [JP] | Japan | 5-304378 |
| Dec. 17, 1993 | [JP] | Japan | 5-318123 |
| Dec. 17, 1993 | [JP] | Japan | 5-318124 |
| Mar. 22, 1994 | [JP] | Japan | 6-050345 |
| Mar. 23, 1994 | [JP] | Japan | 6-052266 |

[51] Int. Cl.⁶ ................................ G03B 17/50
[52] U.S. Cl. ............................. 396/30; 396/159
[58] Field of Search .............. 396/61, 159, 161, 396/164, 213, 226, 228, 30

[56] References Cited

U.S. PATENT DOCUMENTS

| 4,070,684 | 1/1978 | Ettischer et al. | |
| 4,505,560 | 3/1985 | Kozai | |
| 5,144,359 | 9/1992 | Hayashi et al. | 396/61 |
| 5,218,391 | 6/1993 | Kanai et al. | |
| 5,323,204 | 6/1994 | Wheeler et al. | 396/213 X |

FOREIGN PATENT DOCUMENTS 2-109344  8/1990  Japan.

*Primary Examiner*—Howard B. Blankenship
*Attorney, Agent, or Firm*—Young & Thompson

[57] ABSTRACT

A single-use instant camera includes a main body, having the taking lens and the shutter mechanism. A film unit containing chamber is formed in the main body, and contains a plurality of instant the film units stacked on one another. The containing chamber is opened toward a rear and has a front wall. An exposure aperture is formed in the front wall, and receives the image-recording portion of the film units, to provide the film units with exposure to light a entered through the taking lens from an object to be photographed. A front cover is disposed in front of the main body to cover the main body. An advancing claw mechanism is disposed between the front cover and the main body, and advances an exposed one of the film units to be exited. A flash device is disposed between the front cover and the main body, and applies illuminating light to the object. A back lid is disposed behind the containing chamber, is engaged with the main body, and closes the containing chamber. A pressure plate is mounted on the back lid, and presses the film units toward the exposure aperture.

1 Claim, 17 Drawing Sheets

INSTANT CAMERA

This application is a division of application Ser. No. 08/355,247, filed Dec. 2, 1994, now U.S. Pat. No. 5,608,477.

BACKGROUND OF THE INVENTION

1. Field of the Invention

The present invention relates to an instant camera. More particularly, the present invention relates to an instant camera of which a structure is simplified.

2. Description Related to the Prior Art

An instant camera is a camera with which a photograph can be obtained immediately after an object is photographed. The instant camera is loaded with a film pack, which contains a plurality of self-processing instant film units of a mono-sheet type stacked on one another. Each film unit has an image-recording portion, a pod portion disposed on an edge and containing processing solution, and a trap portion disposed opposite to the pod portion for absorbing surplus of the processing solution after being spread. The instant camera incorporates a known claw mechanism, which advances the foremost of the film units after being exposed. The exposed film unit is exited through a top of a body of the camera. The spreading rollers in the camera body rupture the pod portion, and spread the processing solution over the image-recording portion. With the film unit exited from the camera, the processing solution has finished being spread.

The film unit is left to stand for a predetermined duration, to become a photographic print as completed.

The film pack consists of a plastic cartridge or case shaped like a box and a plurality of film units stacked on one another. A back wall of the cartridge has an exposure aperture. A top side of the cartridge has an exit slot for the film units. The inside of the back wall of the cartridge has a pressure plate, which presses the film units against a front wall of the cartridge, and flattens the film units directly behind the exposure aperture or front wall. The film pack in the unused state also contains a light-shielding plate lapped on the foremost of the film units to close the exposure aperture light-tightly. A flap as light-shielding member is mounted in the exit slot, to protect the inside of the film pack from ambient light.

When the loading chamber of the instant camera is loaded with the film pack, the claw mechanism contacts and advances a light-shielding plate, which has protected the film units from ambient light. The light-shielding plate is ejected by the spreading rollers. In exiting of the light-shielding plate, the plate is thrust into a flap, which has been disposed in an exit slot. The light-shielding plate has directly covered the first or foremost of the film units. The foremost film unit is pressed by the pressure plate, and positioned on the exposure aperture, to stand by for photography.

Prior to the photography, the flap must be pushed and torn by the initially advanced light-shielding plate. Accordingly the claw mechanism moving the light-shielding plate requires sufficient drive force. The complicated spreading mechanism is conventionally used with a motor having a great torque. However the motor having the great torque is so expensive as to raise the cost of the camera. When all the film units in the film pack are used, the film pack cartridge or case, and the light-shielding plate remain as waste, of which disposal is a problem in environmental view.

There is a commercially available lens-fitted photo film unit sold with a trade name "Fujicolor Quick Snap" (manufactured by Fuji Photo Film Co., Ltd.), which is a single-use camera pre-loaded with unexposed 35mm negative film. It is conceivable to construct an instant camera as a single-use type like this lens-fitted photo film unit. However, many problems arise with such conception. The use of the film pack enlarges the size of the single-use instant camera, and raises the cost of manufacturing the camera.

In the conventional instant camera, the film units are pressed by a pressure plate toward the front to be kept flat on an exposure aperture. However, the conventional pressure plate has failed to flatten the film units in reliable fashion, as each film unit has the pod portion and trap portion both projected toward the front over the level of the image-recording portion.

While a body of the instant camera includes a film pack loading chamber and a drive mechanism for driving a claw member and spreading rollers, the body is provided with a light-shielding tunnel, with which an exposure opening and the taking lens are associated. An image-recording portion of each film unit is considerably larger than a counterpart of a 35 mm negative film. This results in the greater distance defined between the taking lens and the film unit as positioned, in view of exposure on the larger area. It follows that the light-shielding tunnel has a shape projecting toward a front to a considerably great extent as compared with a camera for the 35 mm film, and seriously affects portability of the camera. In view of the portability, a widely used instant camera has foldable bellows for the light-shielding tunnel, and is collapsible with the construction having a taking lens board disposed in front of the bellows and connected to the body via the bellows. There still remains a problem: such a foldable tunnel makes it necessary for the body to have a space for containing all of the mechanisms for photography. The body is obliged to have a great size. There is no known technique for reducing the space for containing all the mechanisms in the body. In a construction of the instant camera as a single-use type, it is highly difficult to provide the foldable light-shielding tunnel as above, because it would raise the manufacturing cost of the camera.

To advance the film units to the outside of the instant camera, a claw and spreading rollers are actuated as driven by a motor via transmission mechanisms associated with the claw and the spreading rollers, as disclosed in commonly assigned Japanese Utility Model Application No. 2-109344. The claw moves until an edge of the exposed film unit opposite to the claw comes to the spreading rollers, but afterwards the claw must be returned to its home position. It is conventional to use a one-rotation detecting gear to synchronize movement of the claw. The one-rotation detecting gear makes one rotation for advancement of each film unit, and signals a time point of when to stop the motor. In the driving of the spreading rollers, a clutch mechanism is actuated to disconnect the claw from its associated transmission. Upon the finish of the exiting of the film unit, the claw is returned to its home position.

In a construction of the instant camera as a single-use type, a claw mechanism is still used for exiting of advancing the exposed film unit. However it is difficult or impossible to provide the single-use type with the one-rotation detecting gear, a one-rotation detecting base plate for detecting the gear, or the clutch mechanism for detaching the claw mechanism from the motor. A simple detector could detect a position of the claw mechanism to cause the motor to stop. However, a gear would overrun its stop position after the stop of the motor. There would occur irregularities in the stop position of the claw. The film units could not be advanced or exited in regular fashion.

SUMMARY OF THE INVENTION

In view of the foregoing problems, an object of the present invention is to provide an instant camera of which high performance in photography can be consistent with inexpensive construction.

Another object of the present invention is to provide an instant camera of a single-use type capable of effecting exposures with high image quality.

A further object of the present invention is to provide an instant camera that is highly portable.

Still another object of the present invention is to provide an instant camera of which film units can be exited with high stability.

In order to achieve the above and other objects and advantages of this invention, a single-use instant camera includes a taking lens, a shutter mechanism, an advancing claw mechanism for advancing an exposed one of the film units to be exited. The film units include a pod portion located on an edge containing processing solution, an image-recording portion, and a trap portion, located opposite to the pod portion with respect to the image-recording portion, for absorbing surplus of the processing solution remaining after being spread over the image-recording portion. The single-use instant camera includes a main body, having the taking lens and the shutter mechanism. A film unit containing chamber is formed in the main body, for containing a plurality of the film units stacked on one another. The containing chamber is opened toward a rear and has a front wall. An exposure aperture is formed in the front wall, for receiving the image-recording portion of the film units, to provide the film units with exposure to light entered through the taking lens from an object to be photographed. A front cover is disposed in front of the main body to cover the main body. The advancing claw mechanism is disposed between the front cover and the main body. A flash device is disposed between the front cover and the main body, for illuminating the object. A back lid is disposed behind the containing chamber, and engaged with the main body, for closing the containing chamber. A presser device is mounted on the back lid, for pressing the film units toward the exposure aperture.

In a preferred embodiment, a pair of spreading rollers press the exposed film unit, spread processing solution, and eject the exposed film unit. A drive device is disposed beside the light-shielding tunnel, for driving the advancing claw mechanism and the spreading rollers. A flash device illuminates an object to be photographed, and includes a flash emanating section for generating the illuminating light. A printed circuit board is disposed under the light-shielding tunnel, for driving the flash emanating section. A battery holder is disposed opposite to the drive device with reference to the light-shielding tunnel, for containing a battery which supplies the drive device and the flash device with power.

In another preferred embodiment, a motor constitutes the drive device. The advancing claw mechanism includes a rotary plate rotated by the motor. An engaging pin is projected from the rotary plate. A slide plate is disposed slidably toward and away from a shaft of the rotary plate. An advancing claw is disposed on the slide plate, for being contacted on the film units by sliding of the slide plate. An engaging slot is formed in the slide plate to extend crosswise to the slidable direction of the slide plate, for receiving insertion of the engaging pin. The engaging slot is driven by the engaging pin in response to rotation of the rotary plate, to slide the slide plate. In the camera, a claw detecting switch device has at least a portion disposed within a path of sliding of the slide plate, for detecting movement of the slide plate to a predetermined position in the course of rotation of the motor, to detect return of the advancing claw to a home position. A motor control circuit is connected to the motor for driving the motor, and connected to the claw detecting switch device, for stopping the motor in response to detection of the return of the advancing claw to the home position.

In an embodiment in which the taking lens has a fixed f-number $f$, and the shutter mechanism has a fixed shutter speed T in second, the f-number $f$ and the shutter speed T meet $$2 \log_2 f + \log_2 (1/T) - \log_2 (S/100) > 8$$

where S is ISO sensitivity of the film units. The flash device is an auto flash device stabilizing a light amount of the object by adjusting the illuminating light applied to the object. The light amount is regulated to provide the film units with an exposure amount within latitude thereof when the object is illuminated by the illuminating light at an object distance in a predetermined range.

In a further preferred embodiment, an externally depressible shutter release button is disposed. A motor constitutes the drive device. First and second switch devices are connected to the motor, which is rotated while the first and second switch devices are both closed. A release device is disposed movably, and moved from a home position to a depressed position in response to depression of the release button. At least a portion of the first switch device is disposed within a path of movement of the release device. The release device opens the first switch device when in the depressed position, and closes the first switch device when in the home position. A shutter drive lever is disposed movably, and moved from a charging position to a release position in response to movement of the release device to the depressed position, for opening/closing the shutter mechanism. At least a portion of the second switch device is disposed within a path of movement of the shutter drive lever. The shutter drive lever closes the second switch device in response to movement to the release position. The shutter drive lever is driven by the motor to move from the release position to the charging position. A rotary cam device is disposed rotatably, and driven by the motor. At least a portion of the second switch device is disposed within an orbit of rotation of the rotary cam device. The rotary cam device keeps the second switch device closed after a beginning of, and before an end of, one rotation of the rotary cam device irrespectively of a position of the shutter drive lever. The rotary cam device opens the second switch device upon the end of the one rotation, to stop rotating the motor. A rotation continuing device continues supply of current for the motor while the motor is rotated, irrespectively of changes in states of the first switch device or the release device.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
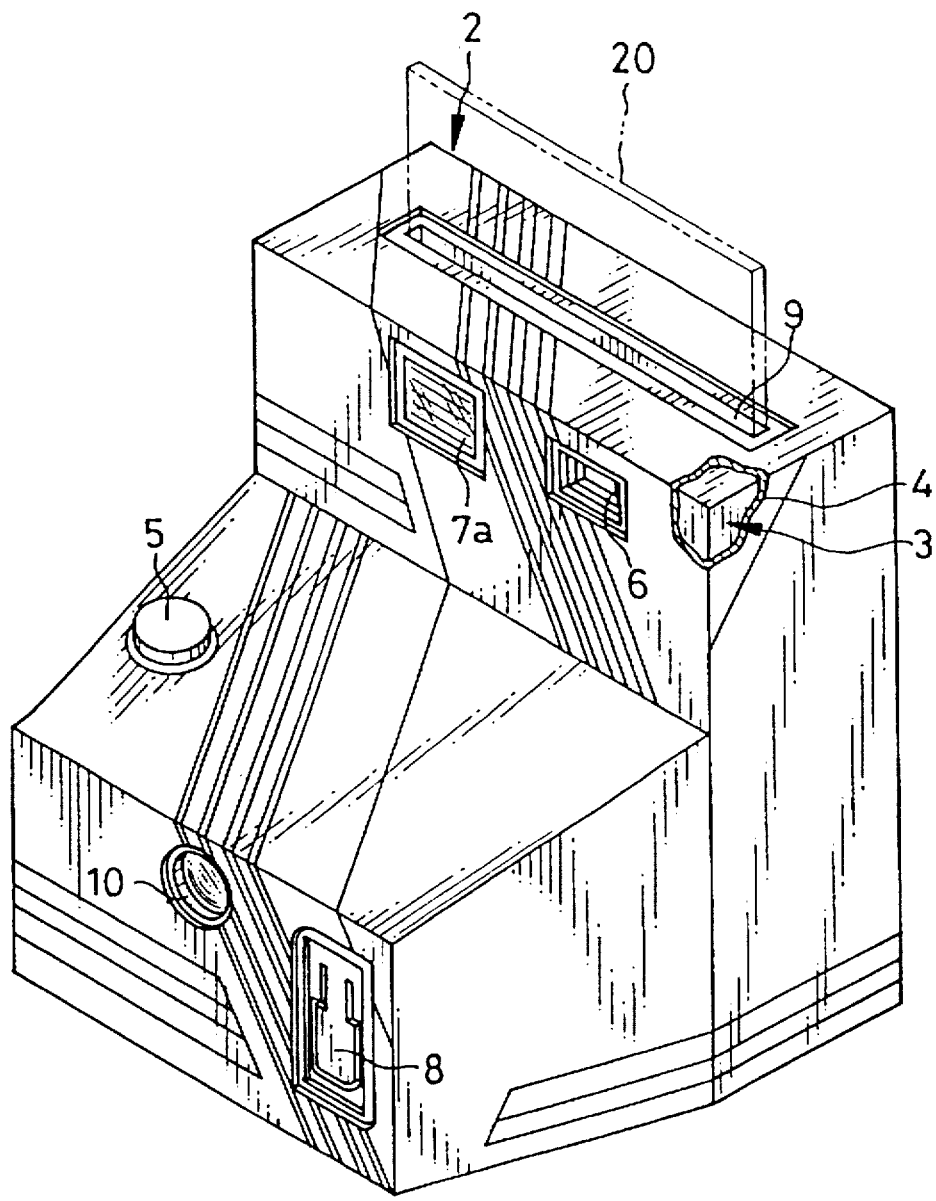
FIG. 1 is a perspective view illustrating an instant camera of a single-use type.

FIG. 1 illustrates an instant camera 2, which is constituted of a camera body 3 having a photograph-taking structure, and a packaging 4 of cardboard for example. The camera body 3 has a shutter release button 5 for releasing a shutter mechanism, a viewfinder 6 for observing a photographic field of view, an electronic flash device 7 including a charge starting switch 8 for charging the flash device 7, and an exposure opening 10. A top of the camera body 3 has an outlet 9 through which each of film units 20 after exposure is exited. The packaging 4 has holes through which the outlet 9, optical structures and operable members for photography of the camera body 3 appear externally.

Figure 2:
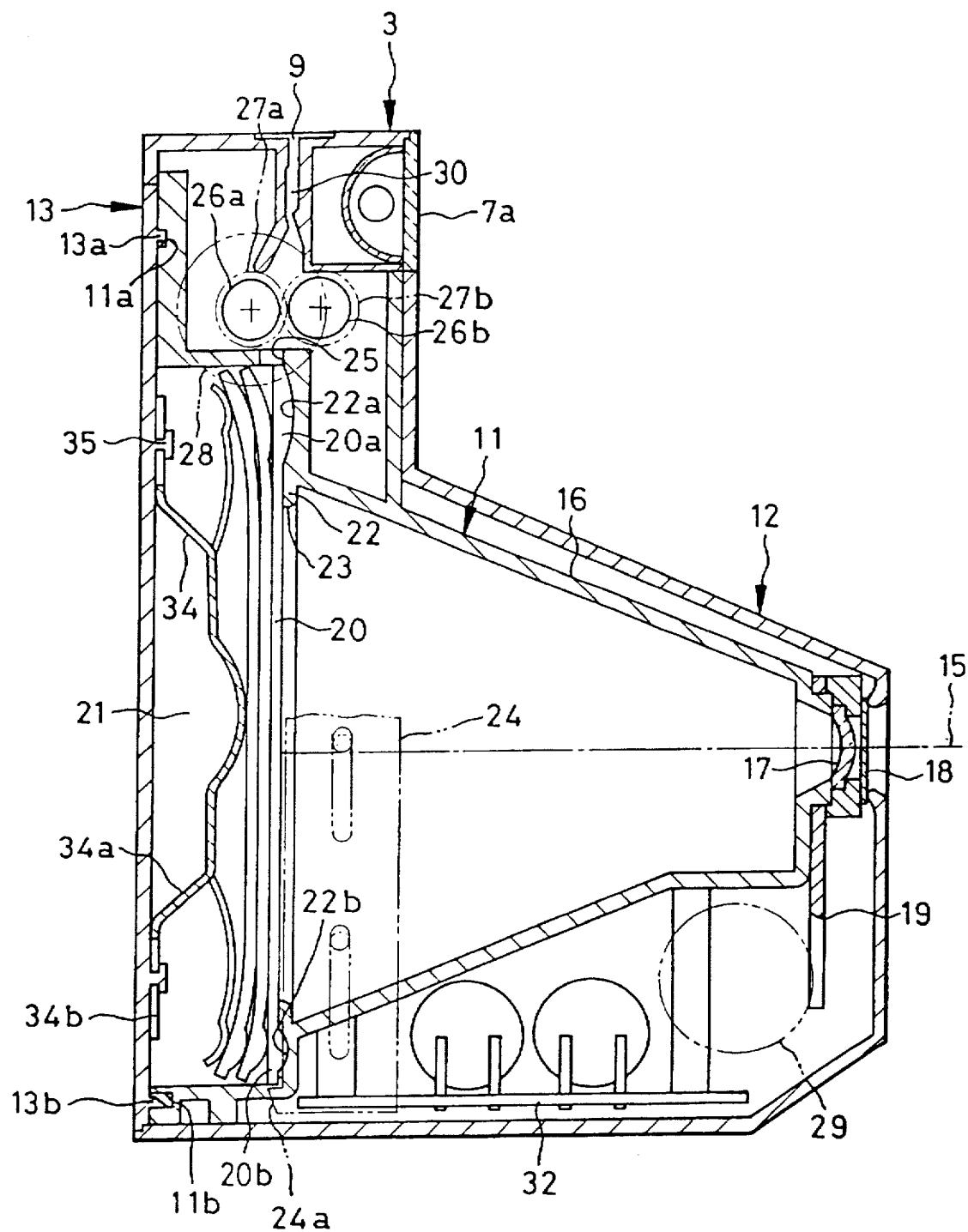
FIG. 2 is a cross section illustrating a main body of the camera.

In FIG. 2, the camera body 3 consists of a main body 11, a front cover 12 and a back lid 13. The main body 11 is provided with a shutter mechanism and other mechanisms for photography. The front cover 12 is fitted on a front of the main body 11 to consist of an outer shell of the camera body 3. A back lid 13 is engaged with the main body 11 and the front cover 12, and covers the rear of the camera body 3.

The main body 11 is formed of opaque resin, and is provided with light-shielding tunnel 16, which covers a photographic light path 15. A lens holder 19 is mounted on a front of the light-shielding tunnel 16, and includes a taking lens 17 and a shutter blade 18. The main body 11 also has a film unit containing chamber 21, which is formed behind the light-shielding tunnel 16, and contains a plurality of instant film units 20 of a mono-sheet, self-processing type. The containing chamber 21 contains the film units 20 in direct fashion without use of any film pack that would be used with a conventional instant camera. The front of the containing chamber 21 is connected to the light-shielding tunnel 16, and is defined by a receiving wall 22. An exposure aperture 23 is formed in the receiving wall 22 for limiting a range on each film unit 20 to be exposed.

The receiving wall 22 has recesses 22a and 22b, which are shaped in correspondence with a solution pod 20a and a trap portion 20b for absorbing surplus solution which is spread from the solution pod 20a and still remains upon development. The recesses 22a and 22b are fitted on the solution pod 20a and the trap portion 20b, and operate to keep the foremost one of the film units 20 flatter on the exposure aperture 23. The exposure aperture 23 has an open area covering an area of an image-recording portion 20c. In other words, the exposure aperture 23 has a size greater than the image-recording portion 20c. The exposure aperture 23 is reliably operated to record an object image on the image-recording portion 20c, even if the film units 20 is accidentally deviated due to irregular assembly or differences in size between the film units 20.

A front of the containing chamber 21 has a cutout 21a(See FIG. 7), in which a clawed plate 24 is partially projected into the containing chamber 21 and disposed to be movable. The clawed plate 24 has an advancing claw 24a, which contacts a trap-side edge of the film units 20, and is moved upward to press the foremost of the film units 20 out of the containing chamber 21 after exposure.

An ejecting port 25 is formed in a top of the containing chamber 21 for exiting the film units 20 after exposure. In positions upstream from the ejecting port 25, there are spreading rollers 26a and 26b disposed in parallel. The film unit 20 after exposure is squeezed between, and advanced by, the spreading rollers 26a and 26b. The processing solution pressed out of the solution pod 20a is spread over the image-recording portion 20c during the passage between the spreading rollers 26a and 26b. Gears 27a and 27b are fixed on distal ends of the spreading rollers 26a and 26b, and are engaged with one another. A gear 28 having a greater diameter is fixed on the gear 27a, and is in mesh with a drive gear connected to a motor 29, which is disposed under the light-shielding tunnel 16. A film path 30 is formed through the front cover 12 and upstream from the spreading rollers 26a and 26b, and communicates with the exit slot 9. The film units 20, therefore, are ejected through the ejecting port 25, between the spreading rollers 26a and 26b, and through the film path 30 and the exit slot 9.

The front cover 12 is formed of opaque resin, and has holes through which the flashing section 7a, the shutter release button 5 and the viewfinder 6 appear. When the front cover 12 is fitted around the main body 11, a bottom of the light-shielding tunnel 16 defines a space, which contains the motor 29 and a printed circuit board 32 which includes an electronic flash circuit and a drive circuit for driving the motor 29.

The back lid 13 is formed of opaque resin, is secured behind the main body 11, and closes the containing chamber 21 light-tightly. To secure the back lid 13, the projections 13a and 13b are engaged with holes 11a and 11b in the main body 11. portions around the projections 13a and 13b on the back lid 13 are welded by application of ultrasonic wave for firm fixation. A resinous pressure plate 34 is mounted behind the back lid 13, and contained in the containing chamber 21 to press the film units 20 toward the front. The pressure plate 34 includes leg portions 34a having slits 34b, which are secured to securing pins 35 of the back lid 13 in removable fashion, for the purpose of the reuse of the pressure plate 34.

Figure 3:
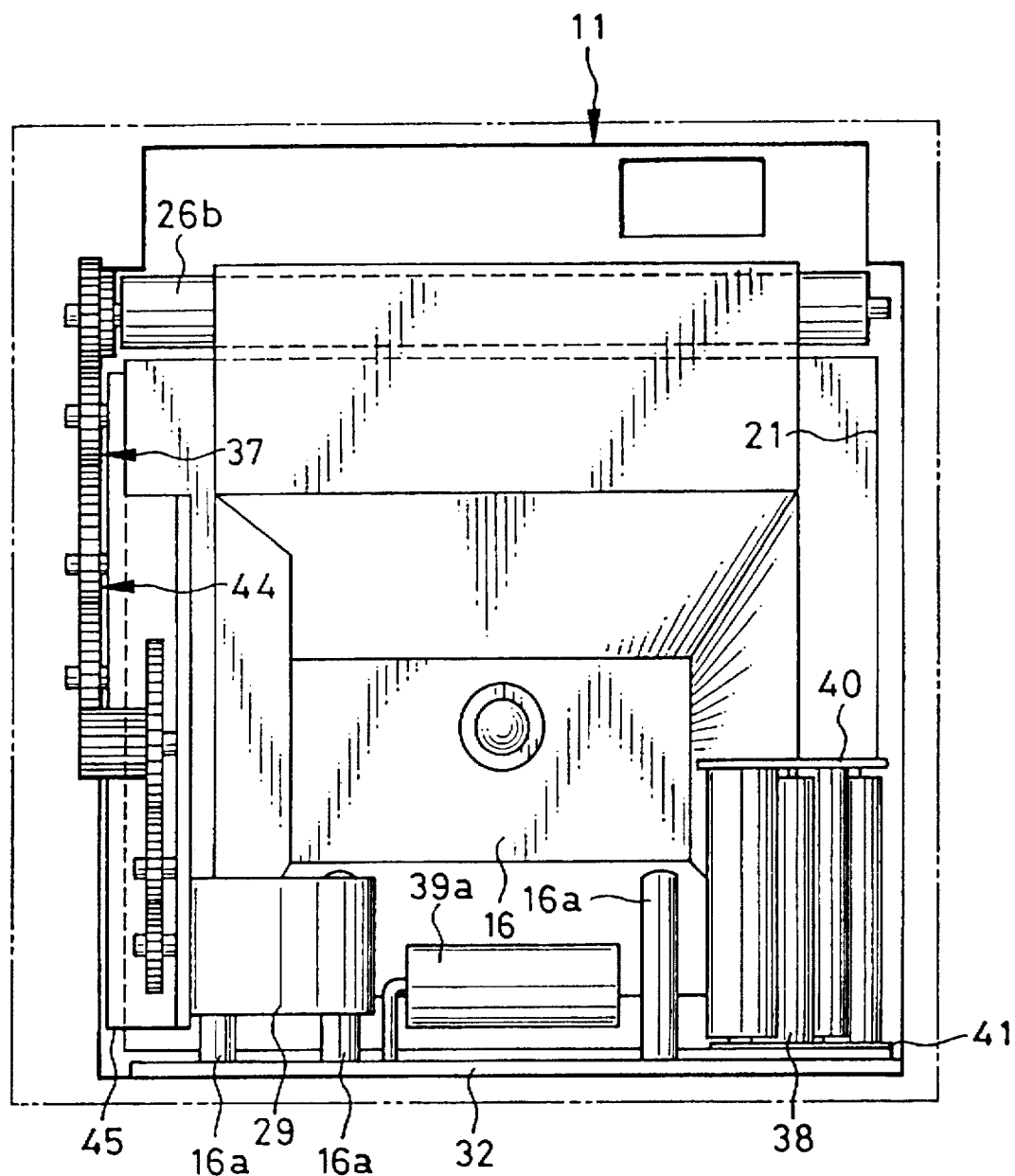
FIG. 3 is an explanatory view in front elevation, illustrating the main body from which the front cover is removed.
Figure 4:
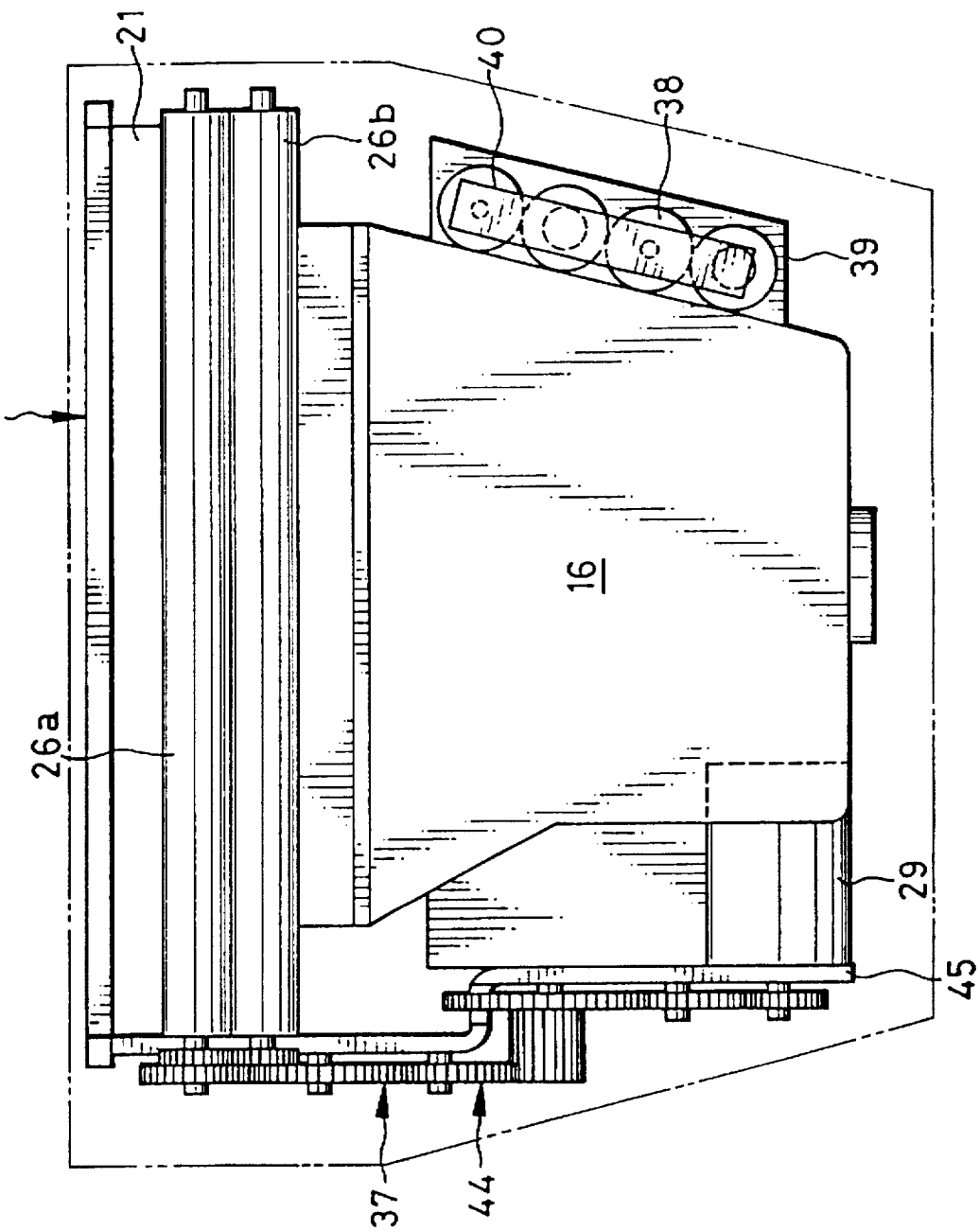
FIG. 4 is an explanatory view in plan, illustrating the main body without the front cover.

FIGS. 3 and 4 illustrates the camera body 3 from which the front cover 12 is removed. On the left side of the light-shielding tunnel 16, a drive unit 44 is disposed, and operates to drive the clawed plate 24 and the spreading rollers 26a and 26b. The drive unit 44 consists of a base plate 45 and a set of gears 37. The base plate 45 is secured to a lateral wall of the containing chamber 21. The gears 37 respond to rotation of the motor 29, and transmit the motion of the motor 29 to the spreading rollers 26a and 26b and the clawed plate 24. The motor 29 is secured to the base plate 45, and disposed under the light-shielding tunnel 16.

On the right side of the light-shielding tunnel 16, four UM-3 dry batteries 38 are contained in a battery holder as power source for the motor 29 and the electronic flash device. The printed circuit board 32 is disposed under the dry batteries 38. A capacitor 39a is secured to the printed circuit board 32 as flash circuit. Bosses 16a are formed in a bottom of the light-shielding tunnel 16. The dry batteries 38 are retained between an upper segment 40 and a lower segment 41, which is secured on the printed circuit board 32 and constitute the battery holder. The segments 40 and 41 are both metallic, and contacted on the dry batteries 38 for the supply of electric power.

The operation of the embodiment is described now. The user of the instant camera 2 holds it and observes a photographic object through the viewfinder 6 in the rear of its eyepiece. If the object is located in a room, the charging switch 8 is depressed to charge the flashing device 7. Upon the end of the charging, a pilot lamp (not shown) is actuated, and checked by the user.

The release button 5 is depressed. The flashing section 7a, is actuated to illuminate, at the same time as a release of the shutter. Subject light entered into the light-shielding tunnel 16 through the taking lens 17 is passed through the exposure aperture 23, and applied to the image-recording portion 20c of the foremost one of the film units 20. The film units 20 are pressed by the pressure plate 34. The solution pod 20a and the trap portion 20b of the foremost film unit are received fitly in the receiving recesses 22a and 22b, so that the foremost one can be kept reliably flat for heightening the image quality, as compared with a chamber without the recesses 22a and 22b. The area of the exposure aperture 23 is greater than the area of the image-recording portion 20c. Even if the film units 20 is positioned in deviation behind the exposure aperture 23, the size of the exposure aperture 23 avoids problems in that a periphery of an image might be cut away from the image-recording portion 23.

After the release of the shutter, the motor 29 is rotated, and causes the drive gear 37 to drive the clawed plate 24 and the spreading rollers 26a and 26b. The clawed plate 24a moves the foremost film unit in an upward direction, through the ejecting port 25, and to a position between the spreading rollers 26a and 26b. The film units 20 as nipped by the rollers 26a and 26b are advanced upward, and simultaneously squeezed, until the solution pod 20a is ruptured. The processing solution is pressed out of the solution pod 20a and spread over the image-recording portion 20c by the rollers 26a and 26b. The surplus processing solution after being spread is absorbed by the trap portion 20b.

The film units 20 are moved by the spreading rollers 26a and 26b toward the top, and passed through the film path 30. The film units 20 are ejected through the ejecting slot 9 to the outside of the camera. With the ejection, the pressure plate 34 presses the remaining ones of the film units 20 against the receiving wall 22, for positioning of the second foremost film unit 20 on the exposure aperture 23. The second foremost film unit has the pod 20a and the trap portion 20b received in the recesses 22a and 22b, and has the well-flattened state.

In the single-use instant camera 2 as embodied, the periphery of the light-shielding tunnel 16 is provided with the printed circuit board 32, the batteries 38 and the drive unit 44, which have comparatively great weight at least partially. This structure is favorable in good balance in weight of the camera 2, which can be held manually with great convenience. The camera 2 can be prevented from being shaken while held manually by the user.

Figure 5:
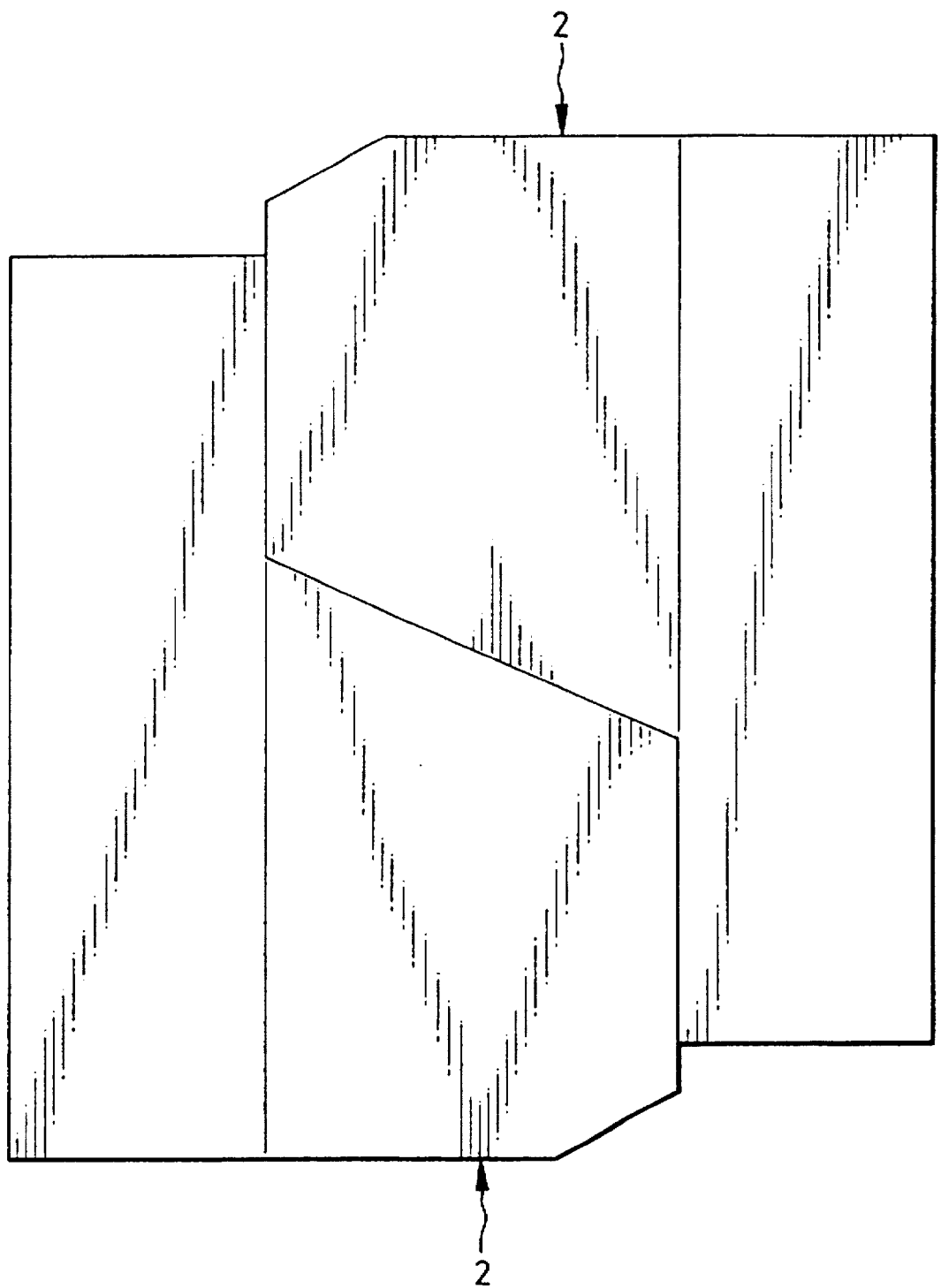
FIG. 5 is an explanatory view in which a pair of instant cameras are combined for being packaged.

The shape of the single-use instant camera 2 is like a letter L in cross section. This is favorable as a pair of the cameras can be combined like a rectangular prism or cube, as illustrated in FIG. 5, for great convenience in collective packaging for the transportation.

Figure 6:
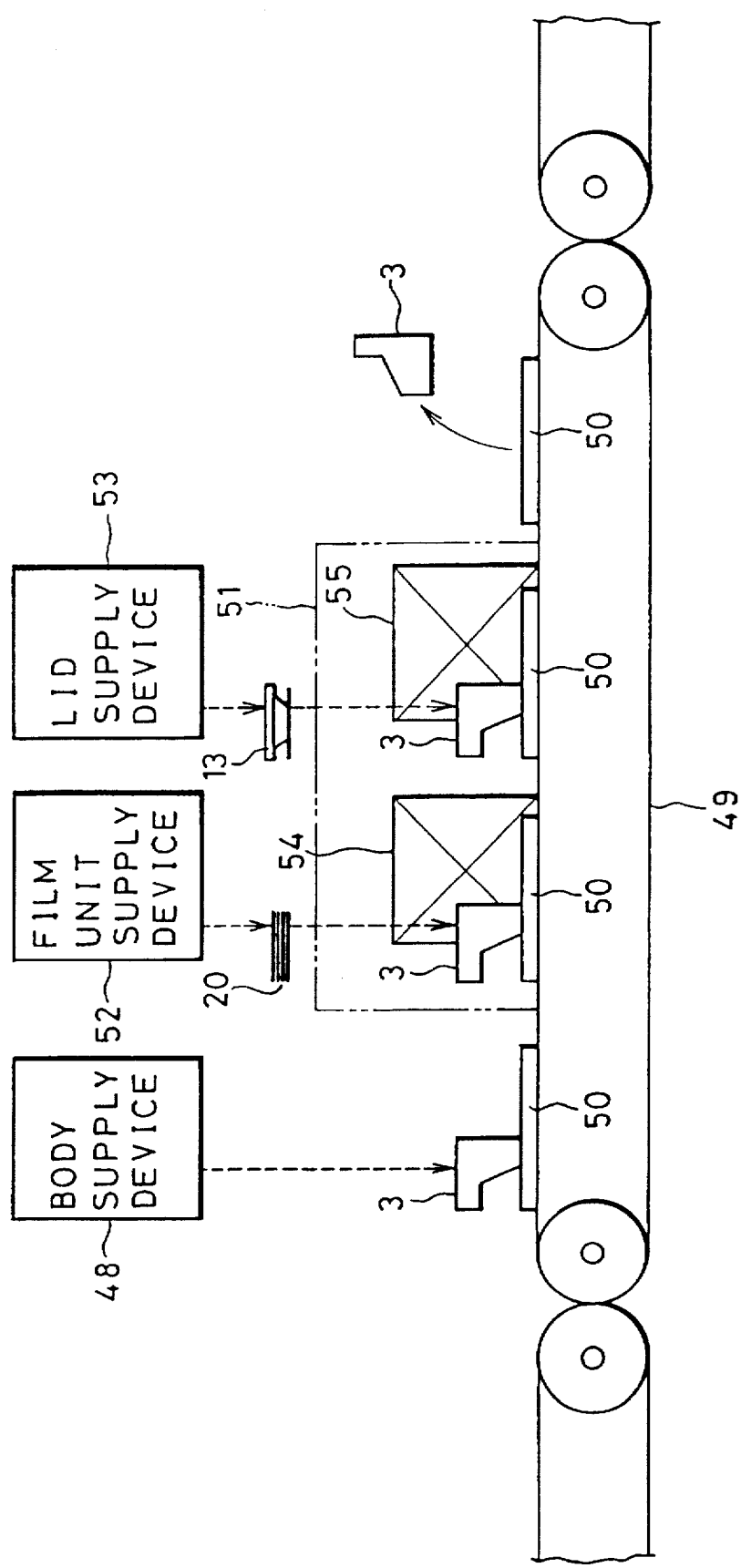
FIG. 6 is a schematic view illustrating a method of manufacturing the instant camera.

The single-use instant camera 2 is manufactured by a manufacturing line in FIG. 6. A body supply device 48 supplies the main body 11 having the front cover 12 and inclusive of the shutter mechanism, and places the main body 11 on a base plate 50 or pallet, which is mounted on a conveyor belt 49. The conveyor belt 49 is intermittently moved by known drive mechanisms in a direction toward the right as viewed in the drawing, and is passed through a dark box or dark room 51. There are also arranged a film unit supply device 52, a back lid supply device 53, and a camera removing station.

The main body 11 placed by the body supply device 48 on the base plate 50 is conveyed to next step at a film unit loading device 54 under the film unit supply device 52 by intermittent movement of the conveyor belt 49. The film unit loading device 54 is located in the dark box or dark room 51. The film units 20 supplied in the predetermined number are grasped by a robot hand constituting the film unit loading device 54, and contained into the containing chamber 21 of the main body 11.

When the operation of the film unit loading device 54 is finished, the conveyor belt 49 is driven again, and conveys the base plate 50 to a back lid securing device 55, which also consists of a robot hand, and grasps the back lid 13 away from the lid supply device 53. The back lid 13 having the pressure plate 34 is caused to cover the containing chamber 21 in engagement with the camera body 3. The periphery of the back lid 13 is fixed by ultrasonic welding, so that the inside of the containing chamber 21 is enclosed in completely light-tight fashion.

Then the camera body 3 is completely constructed as product. The camera body 3 is moved out of the dark box 51 to the conveyor belt 49, and is removed from the base plate 50 in a removing step. Afterwards, the camera body 3 is inspected in various steps, and moved to a station of mounting the packaging 4. The base plate 50 as emptied is moved to lie under the body supply device 48, and conveyed by the belt 49 with the camera body 3 and the back lid 13 placed thereon.

Note that control and activation of the various robot hands and other components can be accomplished through known controllers such as preprogrammed microprocessor, and known drive components, such as motors, solenoids and cylinders.

In the present invention, the instant camera 2 is of a single-use type pre-loaded with the unexposed film units. The present invention is also applicable to a conventional instant camera of a reusable type. In the above embodiment, the film units 20 are ejected through the exit slot 9 in a top of the camera 2. Alternatively it is possible to construct a camera from which the film units 20 are ejected through a bottom, a left, or a right of the camera body.

Figure 7:
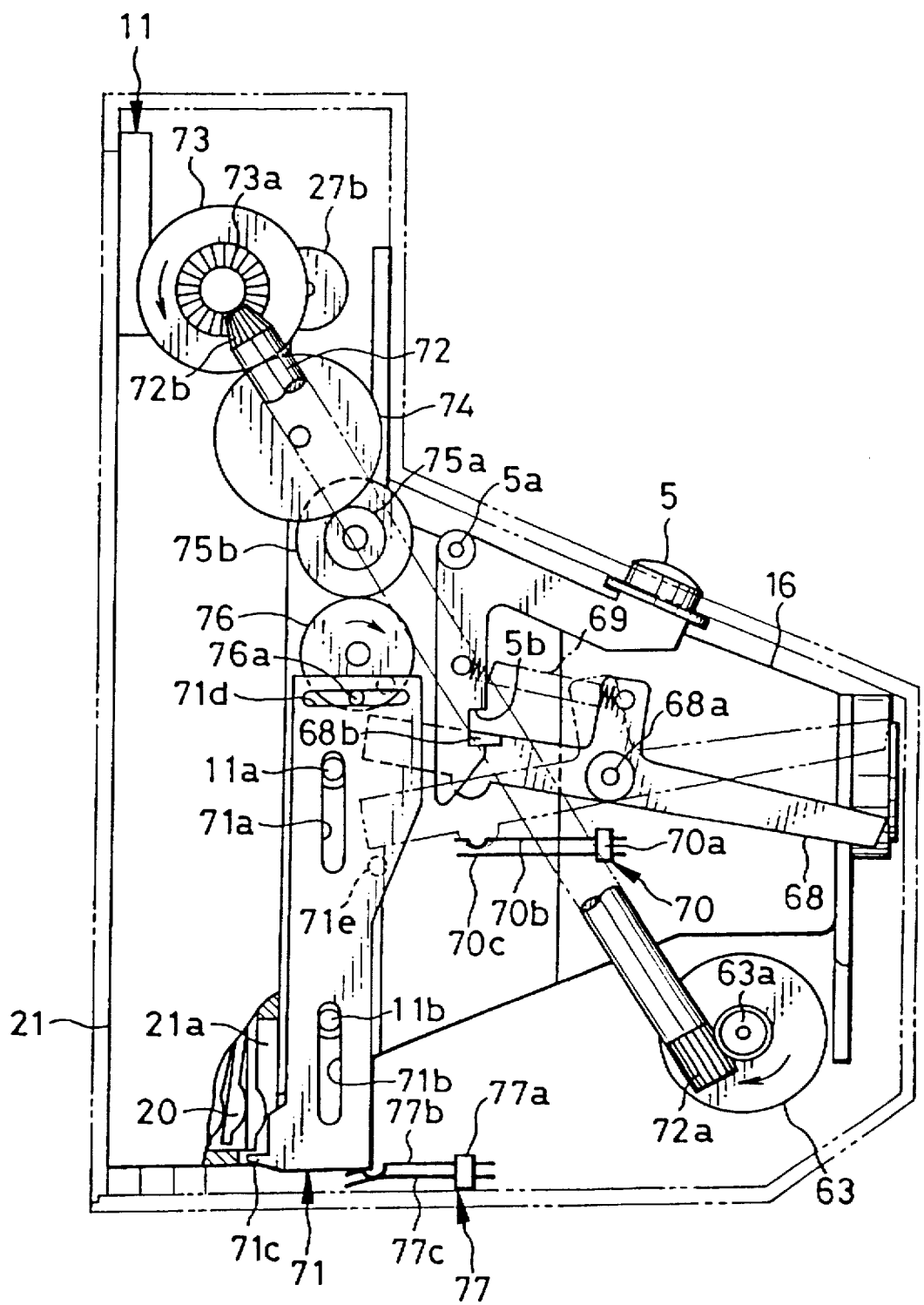
FIG. 7 is a side elevation illustrating a main body of another preferred instant camera in which film units can be exited in stable operation.

FIG. 7 illustrates another preferred embodiment, in which an advancing claw mechanism for advancing film units is improved. Elements similar to those of the above embodiment are designated with identical reference numerals. A right side of the light-shielding tunnel 16 has the shutter release button 5 and a release lever 68, which releases the shutter blade 18 (See FIG. 2) upon the depression of the shutter release button 5. The shutter release button 5 and the release lever 68 are swingable at respective shafts 5a and 68a. The shutter release button 5 and the release lever 68 are connected by a spring 69, and engaged together via a recess 5b and a projection 68b. When the shutter release button 5 is depressed, the projection 68b is disengaged from the recess 5b. The bias of the spring 69 swings the release lever 68 counterclockwise about the shaft 68a, to strike the shutter blade 18 for exposure to the foremost of the film units 20.

Under the release lever 68, a release detecting switch 70 is disposed, for generating a motor starting signal upon detection of the release of the shutter blade 18. The release detecting switch 70 consists of a plastic-formed holder 70a having a characteristic of insulator, and a pair of metallic segments 70b and 70c shaped in thin plates and supported in the holder 70a. The release lever 68 depresses the upper segment 70a, and causes it to contact the lower segment 70c, so as to generate the motor starting signal, which causes a drive circuit of a printed circuit board 64 to rotate a motor 63.

Figure 8:
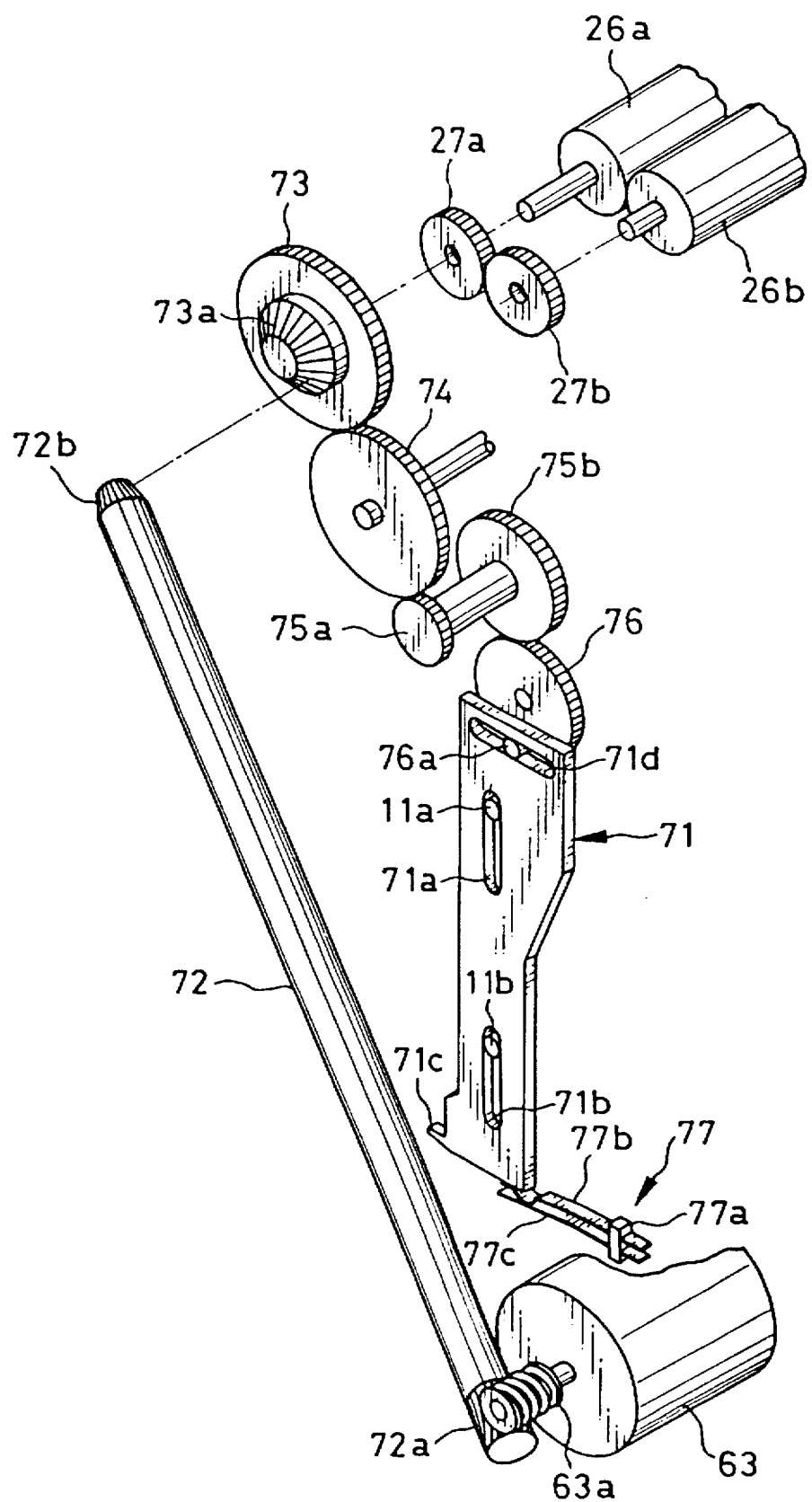
FIG. 8 is a perspective view illustrating a mechanism for driving a clawed plate and spreading rollers.

For driving the spreading rollers 26a and 26b and a clawed plate, a drive mechanism is disposed beside the containing chamber 21. As is illustrated in FIG. 8, rotation of the motor 63 under the light-shielding tunnel 16 is transmitted by a rotary shaft 72 to the spreading roller 26a. A bottom end of the rotary shaft 72 has a worm gear 72a, which is in mesh with a worm 63a fixed on the motor 63. A top end of the rotary shaft 72 has a bevel gear 72b, which is in mesh with a bevel gear 73a fixed on the spreading roller 26a. In transmission of the rotation of the motor 63 to the spreading roller 26a, the rotational speed is reduced by the use of the rotary shaft 72. To the spreading roller 26a is fixed another gear 73, of which rotation is transmitted by gears 74, 75a and 75b to a gear 76 for crank-movement driving the clawed plate 71.

The clawed plate 71 has two slots 71a and 71b formed in a vertical direction. Pins 11a and 11b are formed on the main body 11, and inserted in the slots 71a and 71b to keep the clawed plate 71 slidable vertically. An advancing claw 71c is formed on the bottom of the clawed plate 71.

Figure 9:
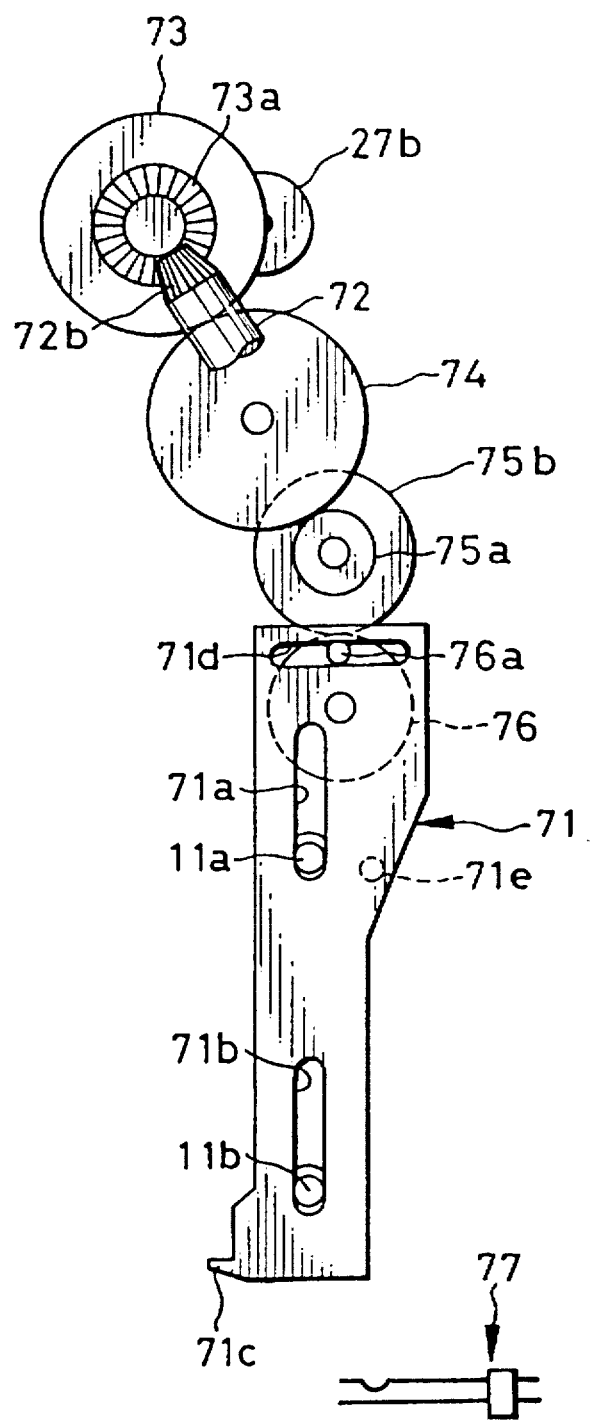
FIG. 9 is an explanatory view illustrating a position where the clawed plate advances the foremost film unit.

To connect the clawed plate 71 to the gear 76, an engaging pin 76a on the gear 76 is inserted in an engaging slot 71d formed in the clawed plate 71. Thus the clawed plate 71 is slid in accordance with the rotational movement of the pin 76a, between a lower dead point of FIG. 7 and an upper dead point of FIG. 9. The lower dead point is a home position of the clawed plate 71.

A claw detecting switch 77 is disposed under the advancing claw 71. The claw detecting switch 77 consists of a holder 77a and a pair of metallic segments 77b and 77c, and has a structure similar to the release detecting switch 70. A bottom of the clawed plate 71 depresses the upper segment 77b, and causes it to contact the lower segment 77c, so as to generate the motor stop signal, which causes a printed circuit board 64 to stop rotating a motor 63.

Figure 10:
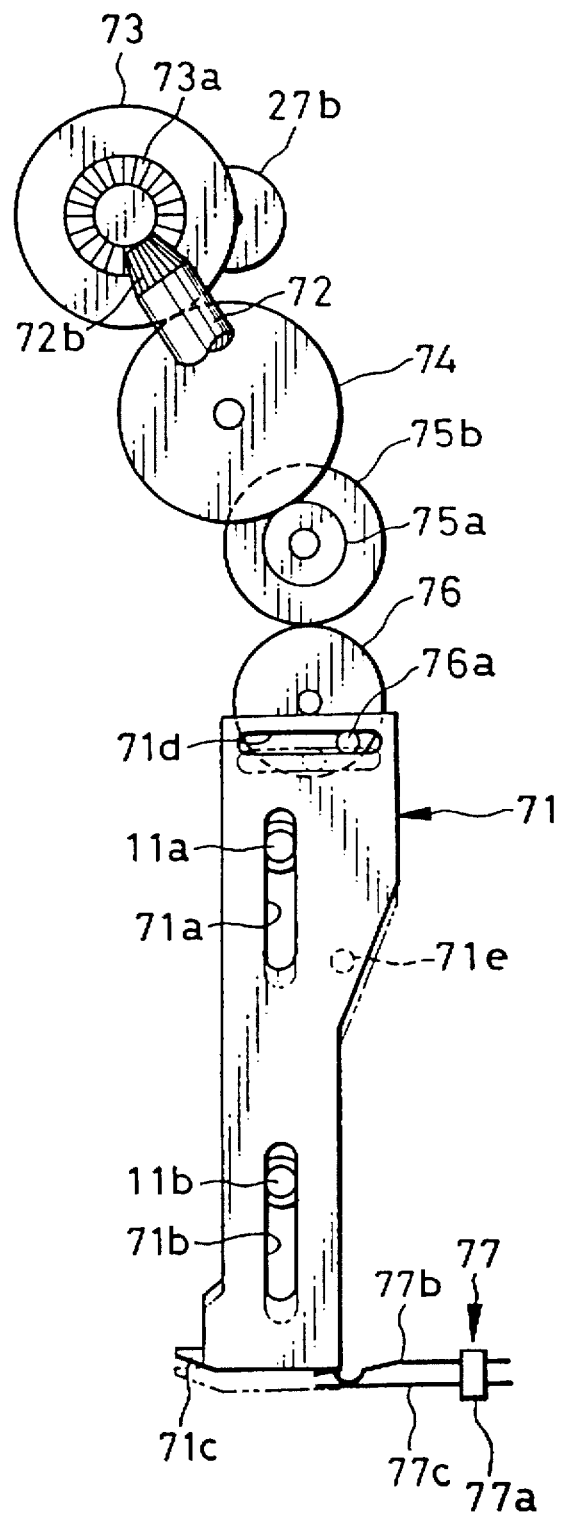
FIG. 10 is an explanatory view illustrating a position where the clawed plate is detected by a detecting switch.

The clawed plate 71 is detected by a claw detecting switch 77 when in the position of FIG. 10, namely when the engaging pin 76a is slightly above its lower dead point, or when the clawed plate 71 is slightly above its home position. Upon the detection, a detecting signal is generated by the claw detecting switch 77 and stops the motor 63. The gear 76 is rotated by inertia at a small amount, and then is stopped in the home position indicated by the phantom lines of the clawed plate 71.

A rear face of the clawed plate 71 has a pin 71e, which is contacted on an end of the release lever 68. In course of the slide of the clawed plate 71 for advancement of the film unit, the pin 71e is contacted on an end of the release lever 68, swings it clockwise, and charges the shutter blade 18.

Operation of the embodiment is referred to now. When the shutter release button 5 is depressed, flash light is emanated by the flashing section 7a. The release lever 68 is disengaged from the release button 5. The release lever 68 is swung by the bias of the spring 69 counterclockwise to strike the shutter blade 18. The foremost of the film units 20 is exposed.

The swing of the release lever 68 actuates the release detecting switch 70. The motor starting signal is generated, to cause the printed circuit board 64 to rotate the motor 63. The motor 63 is rotated clockwise in FIG. 7. With the worm 63a engaged with the worm gear 72a, the rotary shaft 72 is rotated. A bevel gear 72b of the rotary shaft 72 rotates the bevel gear 73a, to rotate the spreading roller 26a in the counterclockwise direction. The spreading roller 26b is rotated clockwise via the gears 27a and 27b.

With the rotation of the spreading roller 26a, the gear 73 is rotated counterclockwise. Its rotation is transmitted by the gears 74, 75a and 75b to the gear 76, which is rotated clockwise. The rotation of the gear 76 causes the engaging pin 76a to move along the slot 71d, so that the clawed plate 71 is slid to the position of FIG. 9 by sliding the pins 11a and 11b through the slots 71a and 71b. The advancing claw 71c is moved through the cutout 21a in the containing chamber 21, and is pressed against the bottom edge, or trap-side edge, of the foremost of the film units 20, to advance it upward. The film unit is then advanced by the spreading rollers 26a and 26b, and exited through the film path 30 and the exit slot 9. The release lever 68 is swung by the pin 71e of the clawed plate 71 clockwise, to charge the shutter blade 18.

The clawed plate 71, having advanced the foremost of the film units 20 to the spreading rollers 26a and 26b, is now slid by the gear 76 in a downward direction. The clawed plate 71 comes to the position in FIG. 10. The bottom edge of the clawed plate 71 presses the upper contact segment 77b of the claw detecting switch 77, so as to contact the upper contact segment 77b on the lower contact segment 77c. Then the motor stopping signal is generated, to cause the printed circuit board 64 to stop the motor 63. Even with the motor 63 stopped, the gear 76 is rotated by inertia to a small extent. The clawed plate 71 is stopped in the home position of FIG. 7. The clawed plate 71 is engaged with the engaging pin 76a at the engaging slot 71d. The home position of the clawed plate 71 corresponds to the lower dead point of the engaging pin 76a. Even if the motor 63 and the gear 76 have different states in rotation of inertia due to irregularities in assemblage or manufacture, there occurs no remarkable difference in the position of the clawed plate 71 as indicated in the phantom lines in FIG. 10. Accordingly the film units 20 can be advanced stably.

In the above embodiment, the rotary shaft 72 has the worm gear 72a and the bevel gear 72b for transmission of the rotation of the motor 63 to the spreading rollers. If a variant motor must be rotated in reverse to the above motor 63, a gear is added between a motor shaft and a transmission rotary shaft.

The instant film unit is one of photo films of which latitude is narrow, like reversal film. For photography at proper exposure, it is necessary precisely to adjust the exposure only with a small error covered in a range of $\pm\frac{1}{4}$ EV or $\pm\frac{1}{2}$ EV. A camera used with the film having the narrow latitude, therefore, requires a photometric device of a high precision, and an exposure control device for controlling a shutter speed, an f-number, and the like precisely.

Inexpensive cameras, such as a lens-fitted photo film unit, have an unchangeable or fixed f-number and shutter speed. Some of them have an electronic flash device of which an amount of light to be emanated is unchangeable. The exposure of the camera relies on the wide latitude of the film to be used.

However, a cost of a camera tends to be considerably raised by incorporating a photometric device or an exposure control device of a high precision.

In such an inexpensive camera, there is no control of exposure whether with a flash device or not. The performance of the camera regarding exposure depends on wide latitude of the negative film to be used therewith. It is impossible for such a camera to effect proper exposure when used with photo film having narrow latitude, such as instant film units or reversal film.

Figure 11:
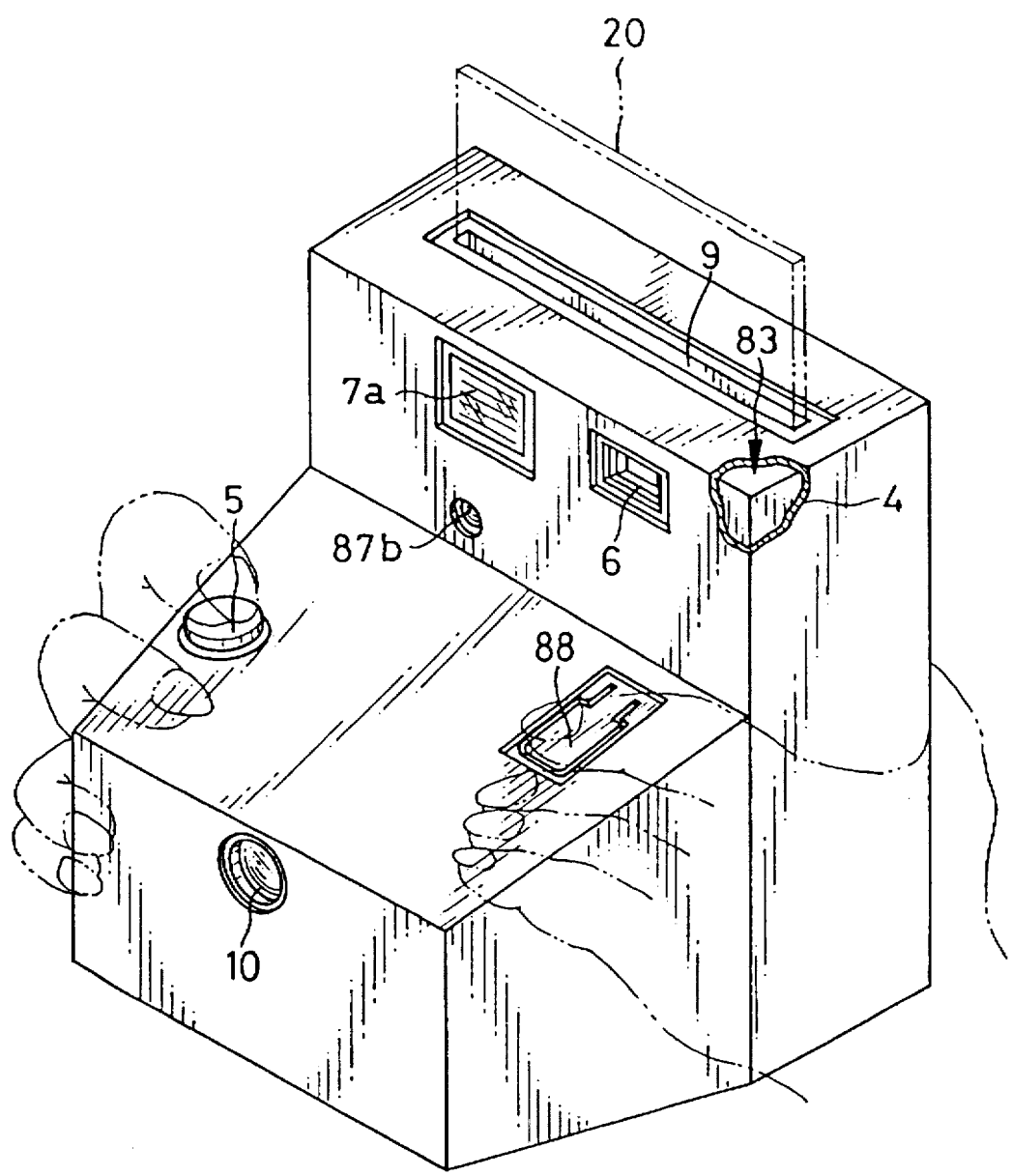
FIG. 11 is a perspective view illustrating still another preferred instant camera of which exposure can be automatically adjusted in fashion suitable for instant photography.
Figure 12:
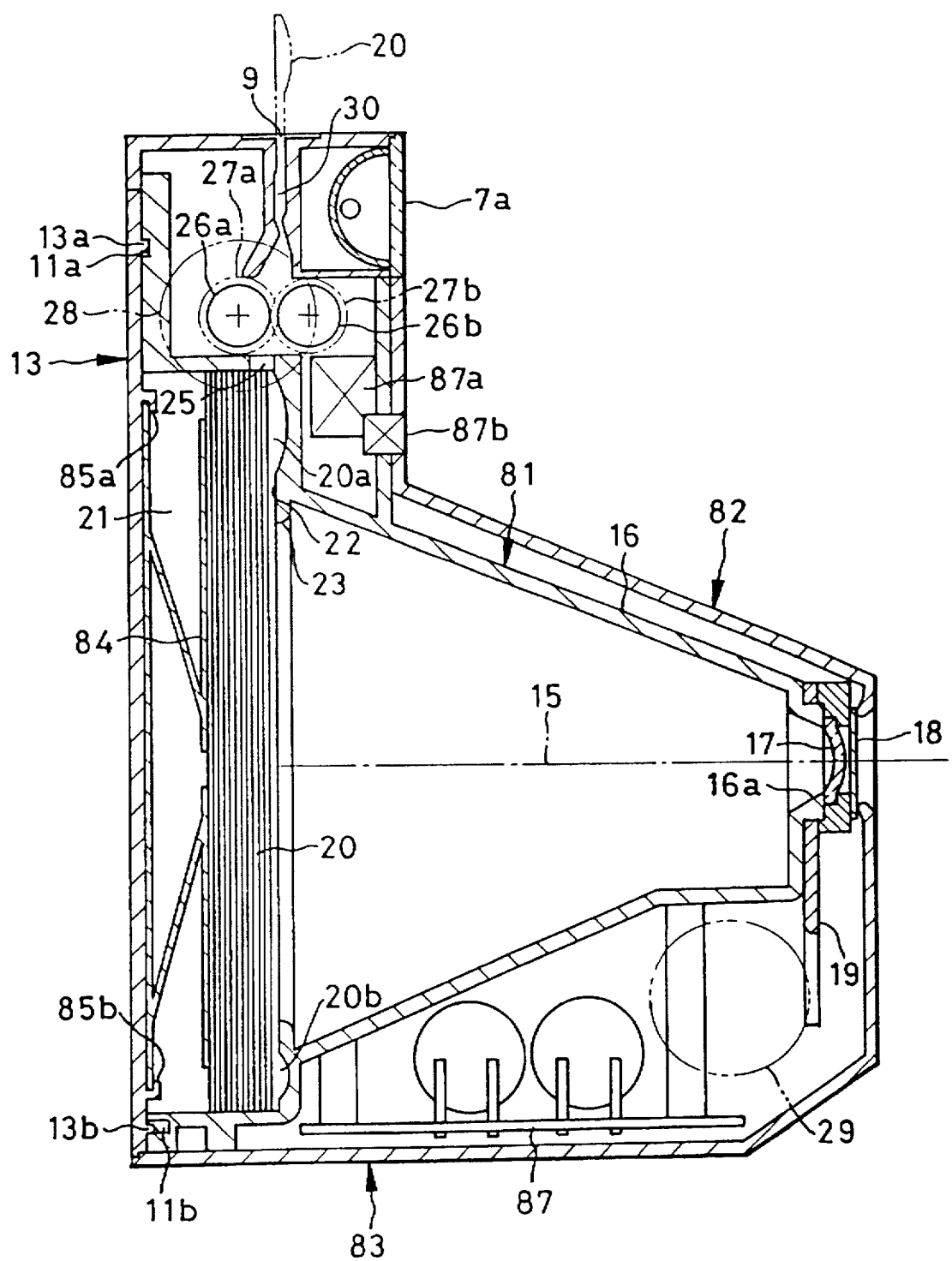
FIG. 12 is a cross section illustrating the camera.

FIG. 11 illustrates a further preferred embodiment, in which an auto flash device is used and which is specialized for indoor photography in consideration of narrow latitude of the film units 20. Elements similar to those of the above embodiments are designated with identical reference numerals. A camera body 83 has the shutter release button 5, the view-finder 6, an auto flash device, a charge starting switch 88 and the exposure opening 10. The auto flash device includes the flashing section 7a, the flash circuit in a printed circuit board 87, a photocell 87b (See FIG. 12), and an integrator circuit 87a. The photocell 87b, appearing as a light-receiving window, receives the flashed light reflected by a photographic object. The integrator circuit 87a receives a signal from the photocell 87b and outputs an integrated value of the signal. An auto flash circuit included in the circuit board 87 receives the integrated value signal from the integrator circuit 87b, and operates to adjust the flash light illuminating the photographic object.

An aperture stop 16a has a diameter represented by an f-number. The shutter blade 18 has a shutter speed T (in second). The values $\underline{f}$ and T meet a condition:

$$2\log_2 f + \log_2 (1/T) - \log_2 (S/100) > 8$$

For example, $\underline{f}$ is 14, and T is $\frac{1}{100}$ second. $\underline{f}$ determined as 14 is based on consideration of avoiding influences of indoor ambient light. T determined as $\frac{1}{100}$ second is based on consideration of preventing camera-shake caused manually by a photographer.

In general, the light amount of the inside of a room as a photographic field is 6 to 9 EV, and if exceptionally greater, substantially 11 EV. The camera of the embodiment is constructed specially for the indoor photography. The auto flash device is combined with a fixed shutter speed and a fixed f-number, and is operated to add light to insufficient light caused by fixation of the shutter speed and the f-number. It is thus possible to expose the film within the latitude of the film even with the fixed shutter speed and f-number. Let S be ISO sensitivity of the film units 20, and EVa be brightness at which the camera effects proper exposure without actuating the auto flash device. EVa is defined as:

$$EVa = 2\log_2 f + \log_2 (1/T) - \log_2 (S/100)$$

Let EV0 be brightness of the object to be photographed, as determined by indoor ambient light illuminating the object.

A difference in brightness is defined as:

$$EV = EV0 - EVa$$

The auto flash device, providing the film unit with light at an exposure amount suitable to the film, is combined with the instant camera. A relative exposure amount EVs is defined as a difference between the suitable exposure amount and the total exposure amount in addition of the flash light and the indoor ambient light. In the range of object-distance where the light is adjustable to the auto flash device, EVs is expressed as:

$$EVs = \log_2 (1 + 2^{EV})$$

If the film units have latitude of $\pm 0.5$ EV, EVa should be determined to meet $|EVs| < 0.5$. To rewrite the equation:

$$2^{EVs} = 1 + 2^{EV}$$

$$2^{EV} = 2^{EVs} - 1$$

$$EV = \log_2 (2^{EVs} - 1)$$

To rearrange this with the equation defining EV:

$$EV0 = EVa + \log_2 (2^{EVs} - 1)$$

If EVa=8 and EVs=+0.5, then EV0=6.73. It follows that, when the indoor ambient light is EV 6.73 or less, the film unit can be exposed within its latitude if $\underline{f}$ and T meet the condition:

$$2\log_2 f + \log_2 (1/T) - \log_2 (S/100) > 8$$

In the embodiment, the film units 20 has ISO sensitivity S=800. As the camera has $\underline{f}$=14 and T=$\frac{1}{100}$, the combination of $\underline{f}$, T and S meets the condition, because the side prior to the inequality sign (>) results in 11.26, which is more than 8. Note that this prior side (which is equal to EVa), depending on the combination of $\underline{f}$ as f-number, T as shutter speed and S as film sensitivity, represents an exposure amount required for proper exposure in association with the values as combined. If the indoor ambient light is 8 EV, then the exposure is insufficient as much as 3.26 EV because $$8 - 11.26 = -3.26 \ EV$$

Accordingly 3.26 EV is the value at which flash light is to be added by the auto flash device. Let an object be targeted at a distance of a range within which the auto flash device is effective. The relative exposure amount relative to the proper exposure amount results in:

$$\log_2 (1 + 2^{-3.26}) = 0.14 \ EV$$

The film units 20 have the latitude of $\pm 0.3$ EV. It follows that the obtained value 0.14 EV is within the latitude of the film units 20.

Figure 13:
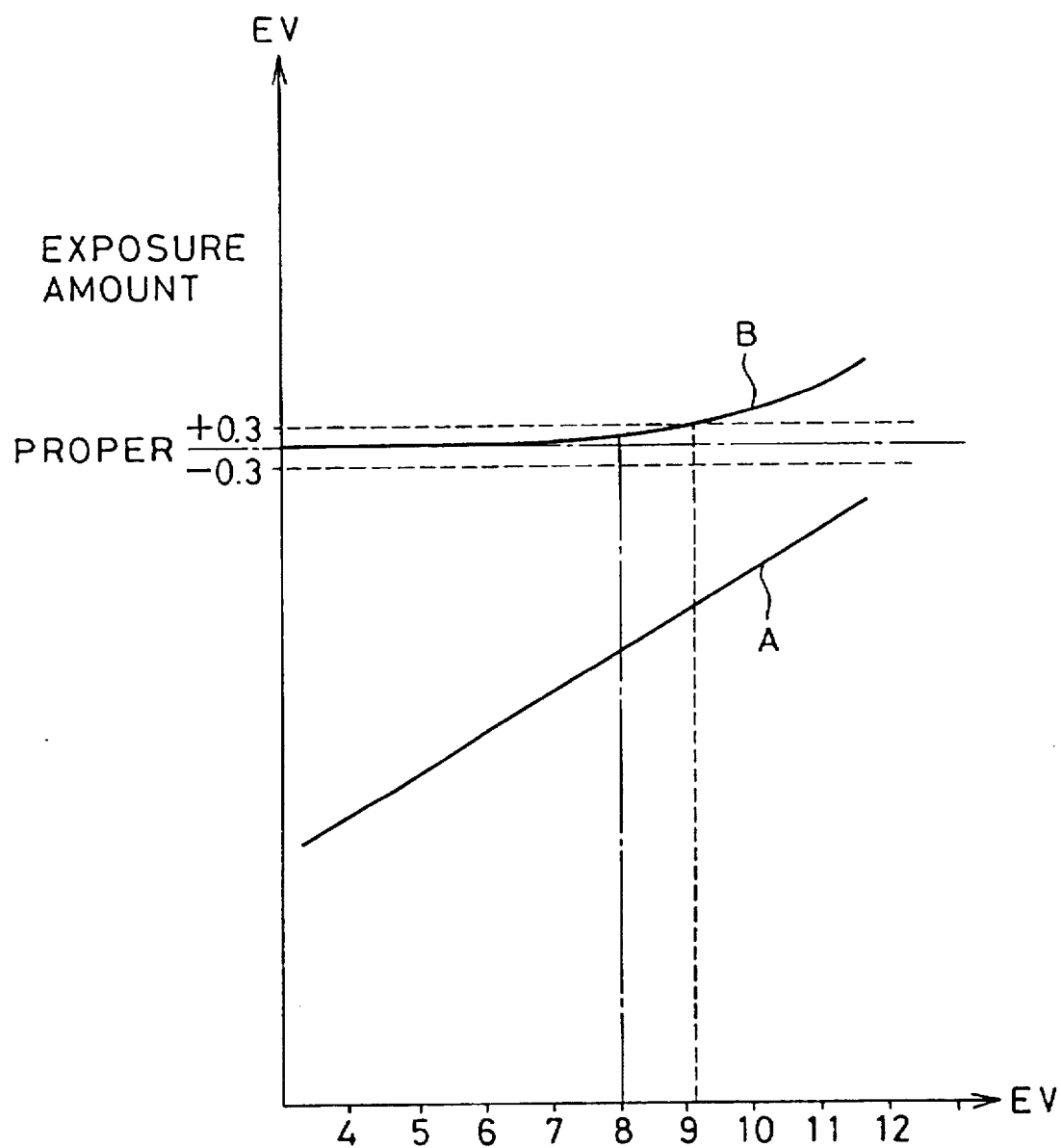
FIG. 13 is a graph illustrating a relationship between illumination and an exposure amount.

FIG. 13 is a graph in which a straight line A indicates an exposure amount simply under the indoor ambient light, and a curved line B indicates an exposure amount under the auto flash device combined with the indoor ambient light. As is understood from the graph, if EV0 as brightness of indoor ambient light is 9.1 EV or less, then the combined illumination can result in exposure covered in the latitude $\pm 0.3$ of the film units 20 as a proper exposure. To be precise, if there is no flash light, then a deficit in exposure amount is 2.15 EV or more, because EVa as brightness sufficient for proper exposure without the auto flash device is 11.26 EV.

This deficit is so great that the simple indoor ambient light results in considerable under-exposure without any recognizable image, due to the narrow latitude of the film units 20. However the deficit is removed by adding the adjusted flash light to the indoor ambient light, so that the proper exposure can be effected even with the fixed f-number and shutter speed. Note that the auto flash device is effective in the range of 1 to 3 meters of the object distance, and adjusts the flash light for proper exposure in the condition of f=14, S=800, and a photographic object in the effective range.

Reference numerals 85a and 85b designate hooks, which retains a pressure plate 84 on the back lid 13. Reference numeral 81 designates a main body, and 82 a front cover.

In operation, the instant camera of the embodiment is used indoors under the brightness of substantially 9.1 EV or less. The photographer holds the instant camera, and observes a photographic object through the viewfinder 6 to target it at the object distance from 1 to 3 meters. A finger of the photographer's left hand depresses the charge starting switch 88, to start charging the auto flash device. The pilot lamp (not shown) is actuated for representing the completion of the charging. Then the shutter release button 5 is depressed.

The flash light is applied by the flashing section 7a, to the object. At the same time the shutter blade 18 is opened. The flash light is reflected by the object, returns toward the camera, and enters the photocell 87b. The integrator circuit 87a calculates integration of the light amount. The auto flash circuit in the circuit board 87 receives the output of the integrator circuit 87a, checks increase of the amount of the light as returned, and in response to the coincidence of the light amount with the proper exposure amount which is predetermined with the aperture stop 16a, stops driving the flashing section 7a, and emanating the flash light.

In the present embodiment, the invention is applied to the single-use instant camera. However, the invention is applicable to a single-use camera used with a roll film, and a reusable camera with any type of film. Among various cameras, the invention can be applied to a camera specialized for reversal film with remarkable advantages. In the above embodiment, the conditioned combination of the f-number, shutter speed and film sensitivity is f=14, T=1/100, and S=800. It is still possible to differently determine a combination of the values to meet the condition. Should the f-number be set 11 or less in combination with S=800, the exposure would be undesirably affected by the indoor ambient light. It is preferred to set the f-number to be more than 11 for S=800. Should the shutter speed be set 1/30 second or slower, the exposure would be likely to be affected by hand shake. It is preferred to set the shutter speed to be higher than 1/30 second. In the above, EVa (=2 log$_2$ f+log$_2$ (1/T)–log$_2$ (S/100)) is conditioned to be more than 8 EV. It is still preferable to condition f, T and S to set EVa>10 EV, or EVa>12 EV, because this further reduces influences of the indoor ambient light to the exposure. It is preferred to set the film sensitivity to be S<800, because the film sensitivity S>800 would be likely to cause the indoor ambient light to affect the exposure.

To spread processing solution, a motor drives the two spreading rollers between which the exposed film unit is exited. However, if there occurs an accidentally great change in the rotational speed of the motor during the exiting of the film unit, the film unit is likely to be involved with irregularities in processing. This is a problem of degradation in image quality of the instant photography.

To solve the problem, the conventional instant camera generally utilizes a microcomputer for controlling the rotation of the motor electrically. The start of driving the spreading rollers is associated with a release button, which is depressed to actuate a shutter mechanism. A return detecting switch detects a return of the release button to a top home position before depression. Upon the depression at the switch, the spreading rollers are started being driven. The spreading rollers are stopped upon the finish of exiting of the film unit. A latch circuit is combined with the return detecting switch, and adapted to avoiding influence of erroneous touch on the release button: should the release button be depressed after the start of the motor, the return detecting switch is turned off. However, the latch circuit, after the start of the motor, forcibly keeps the motor to rotate in fashion irrespective of the depression of the release button.

However, the conventional use of a microcomputer is quite inconsistent to an inexpensive instant camera having a simplified structure, because the microcomputer raises the cost of the camera. The use of the latch circuit is also unacceptable, as it also causes complexity of the control circuit for the motor associated with the spreading rollers, further to raise the cost of the camera.

Figure 14:
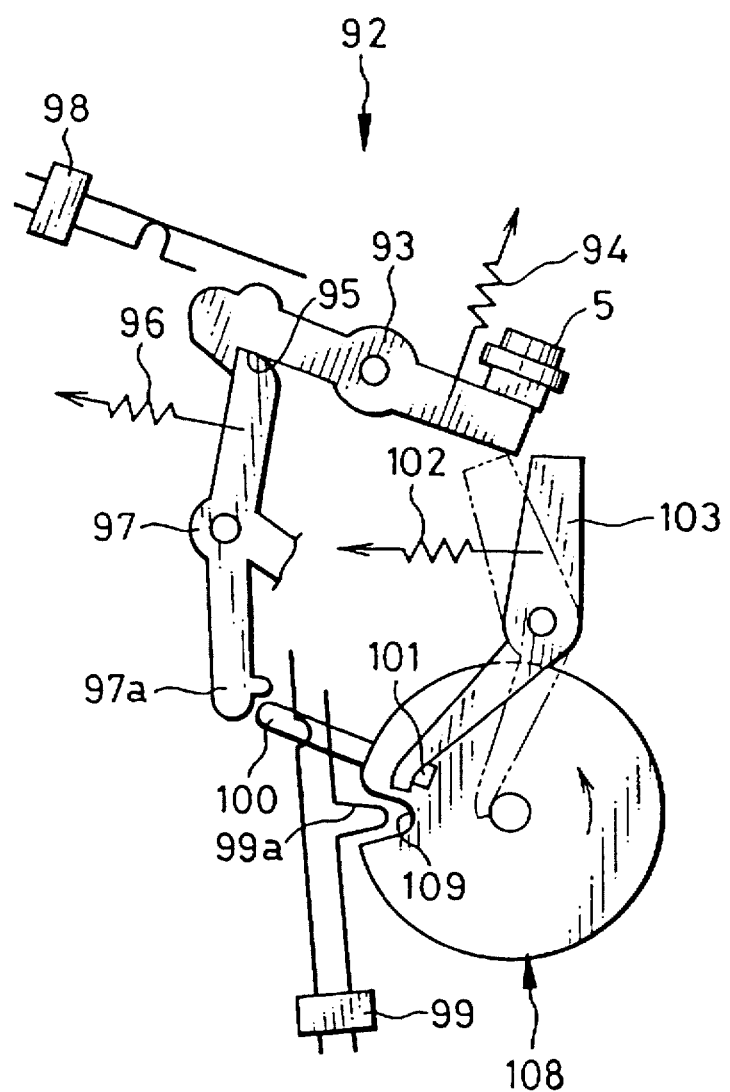
FIG. 14 is a schematic view illustrating a switching mechanism of another preferred camera.
Figure 15:
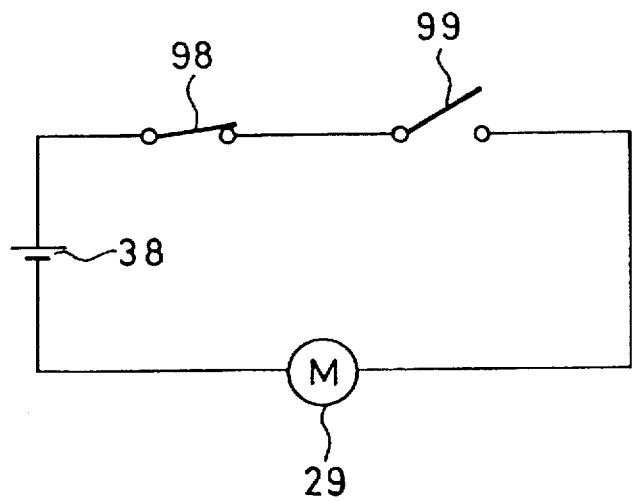
FIG. 15 is a circuit diagram illustrating a circuit driving a motor.
Figure 16:
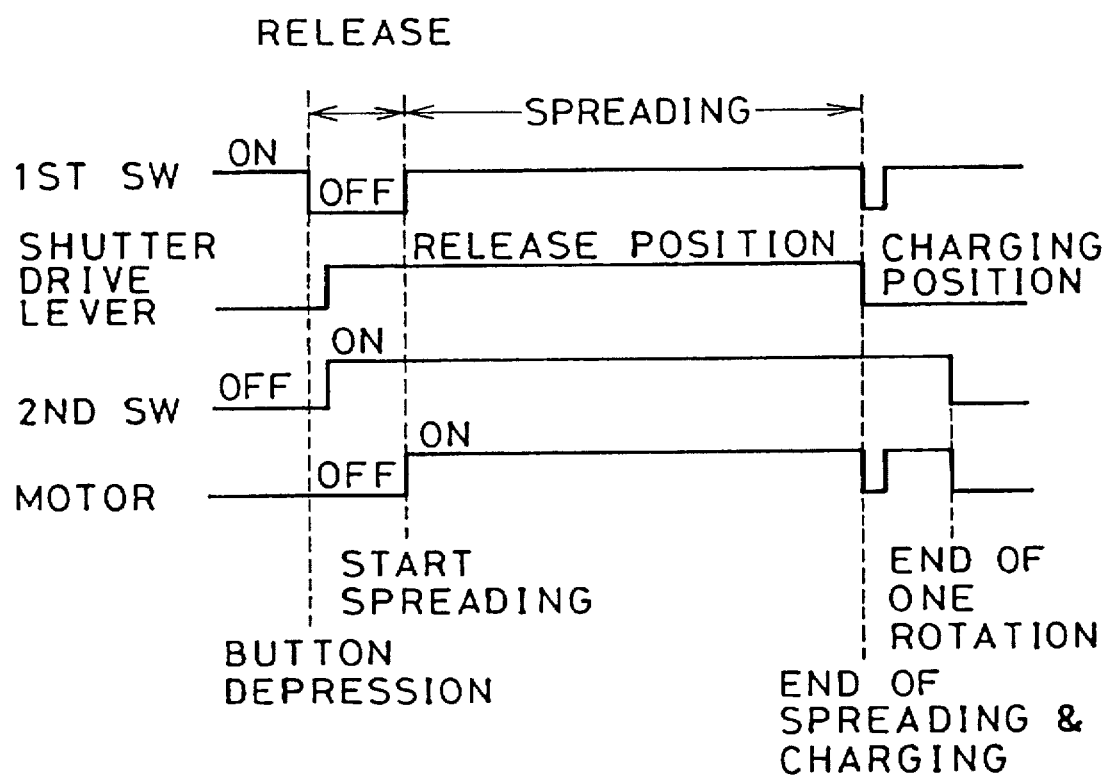
FIG. 16 is a timing chart illustrating a sequence in which two switches are closed and opened.

FIGS. 14 to 16 illustrate still another preferred embodiment, in which rotation of spreading rollers 126 is highly stabilized in an instant camera. Elements similar to those of the above embodiments are designated with identical reference numerals. In FIG. 15, the motor 29 is connected to the battery 38, a first switch 98 and a second switch 99 in serial fashion. The motor 29 is rotated only when both of the switches 98 and 99 are closed.

FIG. 14 illustrates a switching mechanism 92 which is incorporated in the instant camera for switching on and off the switches 98 and 99. When the release button 5 is depressed, a retaining lever 93 is rotated in a clockwise direction against a bias of a spring 94, to open the release switch 98. The retaining lever 93 has a hook portion 95. A shutter drive lever 97 is biased by a spring 96, and adapted to driving a front shutter mechanism 112 (See FIG. 17). The shutter drive lever 97 is retained by the hook portion 95. The shutter drive lever 97 has an arm portion 97a, which closes the second switch 99 when rotated in a counterclockwise direction.

A projected portion 99a is formed on one of the two contact segments of the second switch 99, is pressed by a periphery of a one-rotation cam 108 rotated via gears (not shown) by the motor 29, so that the second switch 99 is closed in fashion irrespective of pressure of the arm portion 97a. The periphery of the one-rotation cam 108, as rotary cam device, has a notch 109 into which the projected portion 99a is fitted, and a returning lever 100, which presses the arm portion 97a against its bias, for returning the shutter drive lever 97 to the charging position. The second switch 99 is opened when the projected portion 99a is inserted in the notch 109. The notch 109 has a rotational position different from that of the returning lever 100 around the one-rotation cam 108. The returning lever 100 is kept from contacting the second switch 99.

A face of the one-rotation cam 108 has a projection 101. A stopper arm 103, which is biased by a spring 102, is contacted on the projection 101. The retention between the projection 101 and the stopper arm 103 is released immediately after the one-rotation cam 108 starts rotation by closing of both switches 98 and 99. The stopper arm 103 is moved into an orbit of the retaining lever 93, so that, even when the release button 5 receives downward force, the stopper arm 103 contacts the retaining lever 93 to prevent the retaining lever 93 from rotating. When the one-rotation cam 108 is rotated continuously, the projection 101 presses the stopper arm 103 against the bias of the spring 102, rotates the stopper arm 103 in the clockwise direction, and retracts it from the orbit of the retaining lever 93.

The operation of the camera is described by referring to FIG. 16. An object is observed through the viewfinder 6. The release button 5 is depressed. The retaining lever 93 is rotated in the clockwise direction in FIG. 14. The release switch 98 is opened. The hook portion 95 is disengaged from the shutter drive lever 97. The shutter drive lever 97 is rotated in the counterclockwise direction, to open/close the front shutter 112. The second switch 99 is closed.

When the release button 5 is returned up to a home position prior to the depression, the retaining lever 93 is rotated by the bias of the spring 94 in the counterclockwise direction, to close the first switch 98. Then both of the first and second switches 98 and 99 are closed. The motor 29 is rotated.

When the motor 29 is rotated, the advancing claw, spreading rollers 126 (FIG. 17), and the one-rotation cam 108 are driven via the gears (not shown). Upon the start of rotation of the one-rotation cam 108, the projected portion 99 i ais pressed by the periphery of the one-rotation cam 108. The second switch 99 is closed, irrespective of pressure from the arm portion 97a. The stopper arm 103, disengaged from the projection 101, is entered under the retaining lever 93 by the bias of the spring 102, and rotated to the position indicated by the phantom line in FIG. 14. Even when the release button 5 is touched by a photographer, the first switch 98 is kept closed by the contact of the retaining lever 93 with the stopper arm 103. Therefore the motor 29 is rotated continuously.

In the rotation of the motor 29, the spreading rollers 126 finish spreading the processing solution. The projection 101 presses the stopper arm 103. The stopper arm 103 is rotated in the clockwise direction, and is retracted from the orbit of the retaining lever 93. The retaining lever 93 is allowed to rotate in the clockwise direction, to enable depression of the release button 5. The one-rotation cam 108 is rotated further. The returning lever 100 presses the arm portion 97a, to rotate the shutter drive lever 97 in the clockwise direction.

The shutter drive lever 97 is captured by the hook portion 95 of the retaining lever 93. The projected portion 99 i ais being pressed by the periphery of the one-rotation cam 108. The second switch 99 is closed. Slightly before retention of the retaining lever 93, the shutter drive lever 97 presses the retaining lever 93 against the bias of the spring 94. The retaining lever 93 is rotated in the clockwise direction, to open the first switch 98.

The motor 29 stops rotating to stop the one-rotation cam 108. The retaining lever 93 is rotated in the counterclockwise direction by the bias of the spring 94. The first switch 98 is closed again. Upon the closing of the first switch 98, the motor 29 restarts rotation, to rotate the one-rotation cam 108. The projected portion 99a is inserted in the notch 109, to open the second switch 99. The motor 29 is stopped rotating. The camera now stands by for next operation of photography.

Figure 17:
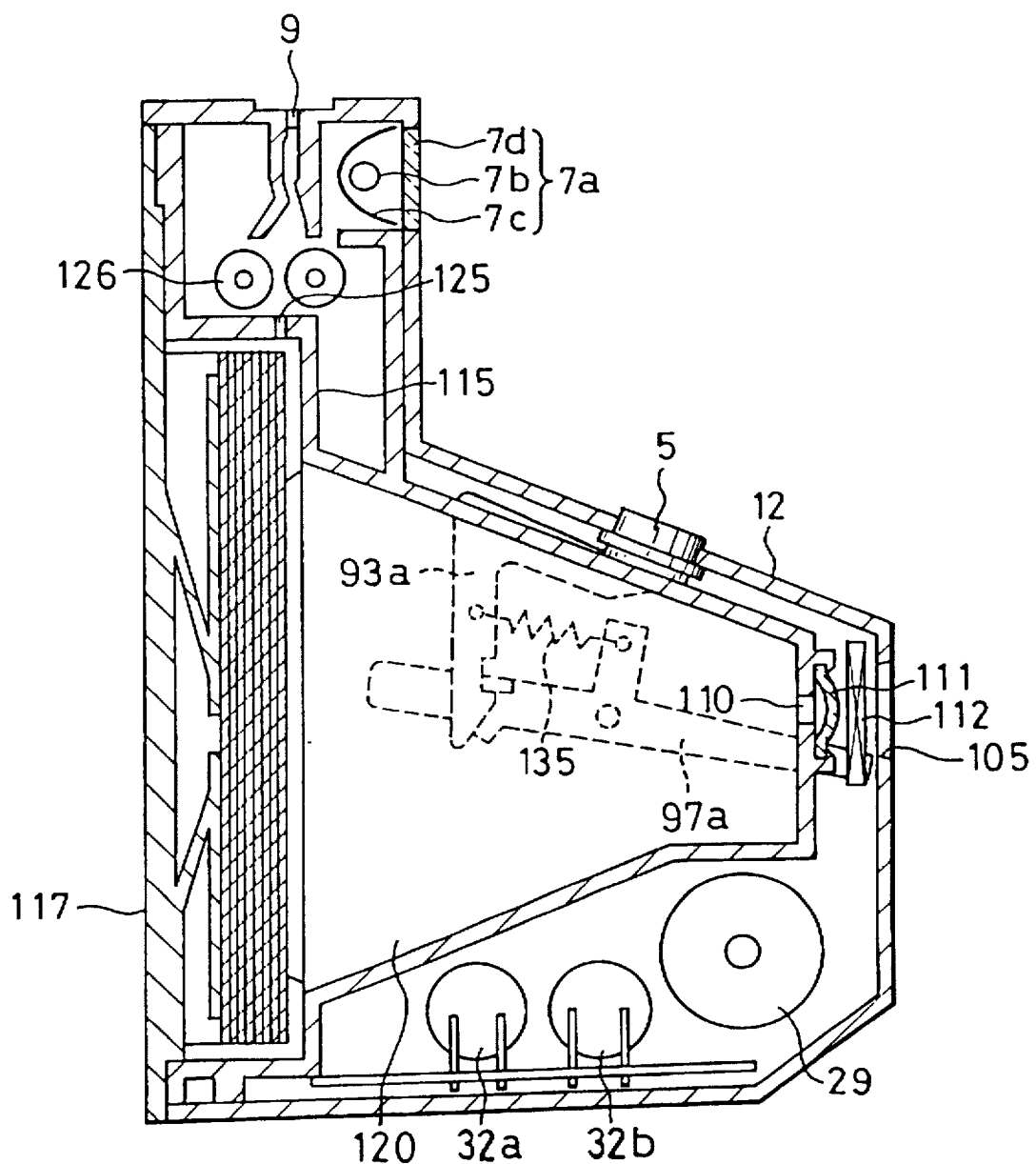
FIG. 17 is a cross section illustrating a variant of camera.

In the above embodiment, the retaining lever 93 is biased by the spring 94. The shutter drive lever 97 is biased by the spring 96. The retaining lever 93 and the shutter drive lever 97 are biased in the counterclockwise direction. Alternatively, a common extension coil spring 135, as illustrated in FIG. 17, can be connected to a retaining lever 93a and a shutter drive lever 97a, to bias them both counterclockwise. Note that the flashing section 7a consists of an electronic flash tube 7b, a reflector 7c and a diffusing plate 7d. The printed circuit board 32 is provided with a main capacitor 32a and a capacitor 32b for boosting voltage. Reference numeral 105 designates an exposure opening, 110 a shutter opening, 111 a taking lens, 115 a main body, 117 a rear cover, 120 an exposure tunnel, and 125 an ejecting port.

Figure 18:
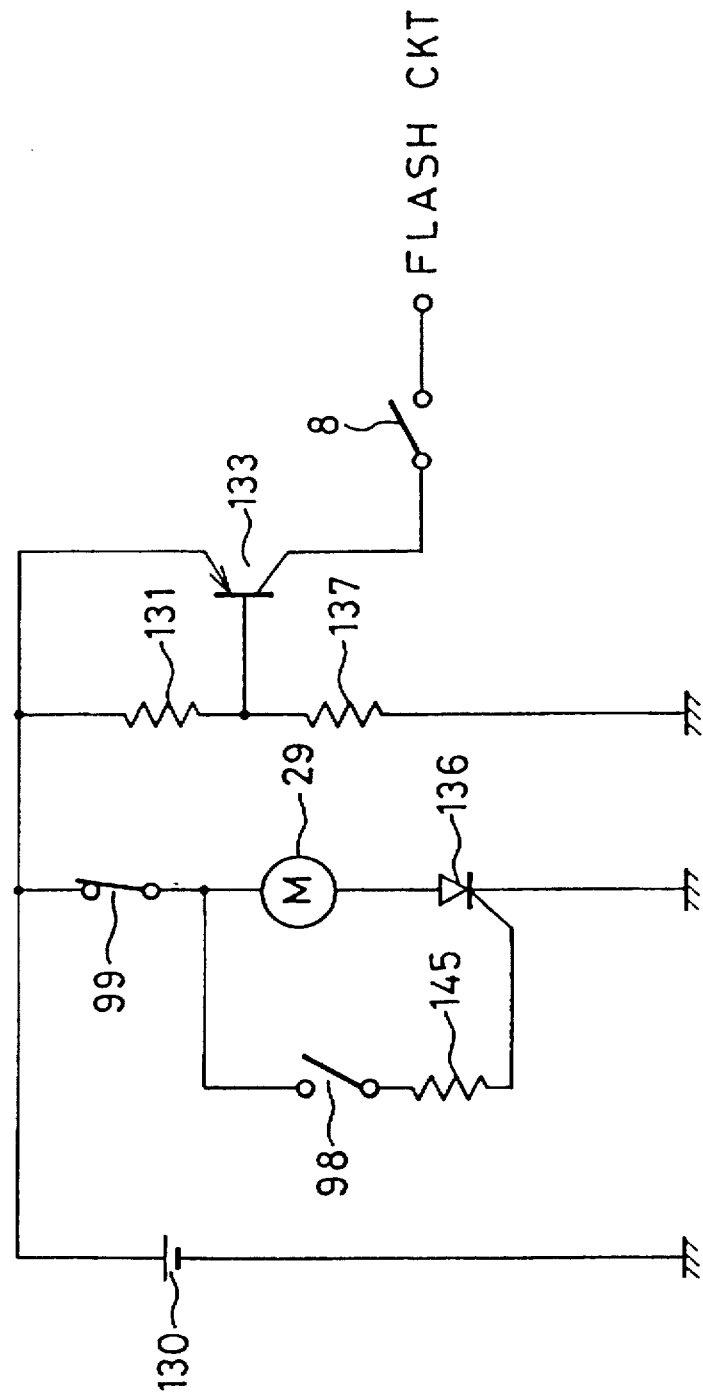
FIG. 18 is a circuit diagram illustrating another preferred circuit associated with driving of the motor.

FIG. 18 illustrates a variant construction having a thyristor while eliminating the stopper arm. There is arranged a battery 130, which is connected to a resistor 131, the second switch 99 to be closed by the shutter drive lever 97, and a switching transistor 133 in parallel fashion. A collector of the switching transistor 133 is connected to a flash circuit (not shown) via the flash charging switch 8.

The second switch 99 is connected to a gate of a thyristor 136 serially via the first switch 98 associated with the release button 5 and a resistor 145. To the second switch 99 is connected the motor 29, which is in turn connected to an anode of the thyristor 136. An emitter of the switching transistor 133 and a resistor 137 are connected to the resistor 131 in parallel. The resistor 137 is adapted to turning on the switching transistor 133 when current flows through the resistors 131 and 137 with the second switch 99 opened.

In operation, the release button 5 is depressed first. The shutter drive lever 97 is driven, to close the second switch 99. When the release button 5 is stopped from being depressed, the second switch 99 is closed. The thyristor 136 is turned on, to rotate the motor 29. The rotation of the motor 29 continues until the second switch 99 is opened, in fashion irrespective of the open state of the first switch 98.

In the continuous rotation of the motor 29, only small current flows through the resistors 131 and 137. The switching transistor 133 is turned off. No current is supplied for the flash circuit by the battery 130. Stable current is supplied for the motor 29, which is never involved with any irregularities in rotation.

The rotation of the motor 29 drives the advancing claw, the spreading rollers 126, and the one-rotation cam 108. The movement of the advancing claw and the spreading rollers 126 spreads the processing solution of the foremost of the film units 20, which is ejected from the camera. The rotation of the one-rotation cam 108 returns the shutter drive lever 97 from the release position to charging position. The second switch 99 is opened, and stops the motor 29, to stand by for next operation of photography.

When the second switch 99 is opened, electric current flows through the resistors 131 and 137, to turn on the switching transistor 133. The flash charging switch 8 is closed. Then the battery 130 supplies electric current with the flash circuit. In course of rotation of the motor 29, the thyristor 136 is kept turned on in fashion irrespective of the first switch 98 opened by depressing of the release button 5, until the second switch 99 is opened. This avoids occurrence of problems if the release button 5 is touched in course of the spreading, in the same way as the former embodiment.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An instant camera including a photographic optical system and a shutter mechanism, for use with photo film loaded therein, said camera comprising:

said photographic optical system having a fixed number f;

said shutter mechanism having a fixed shutter speed T in seconds;

said f-number $f$ and said shutter speed T meeting $$2 \log_2 f + \log_2 (1/T) - \log_2 (S/100) > 8$$

where said S is ISO sensitivity of said photo film; and an auto flash device for applying illuminating light to an object to be photographed, and for adjusting an amount of said illuminating light applied to said object, to provide said photo film with an exposure amount within latitude thereof when said object is illuminated by said illuminating light at an object distance in a predetermined range, wherein said auto flash device comprises a photocell which detects light from said object to be photographed, said photocell providing an output to an integrator, said integrator being used by said auto flash device to determine when said exposure is within said latitude.

* * * * *